US009997007B2

(12) United States Patent
Acres

(10) Patent No.: US 9,997,007 B2
(45) Date of Patent: Jun. 12, 2018

(54) METHOD AND SYSTEM FOR IMPLEMENTING MYSTERY BONUS IN PLACE OF BASE GAME RESULTS ON GAMING MACHINE

(75) Inventor: John F. Acres, Las Vegas, NV (US)

(73) Assignee: PATENT INVESTMENT & LICENSING COMPANY, Las Vegas, NV (US)

( * ) Notice: Subject to any disclaimer, the term of this patent is extended or adjusted under 35 U.S.C. 154(b) by 1205 days.

(21) Appl. No.: 12/572,012

(22) Filed: Oct. 1, 2009

(65) Prior Publication Data

US 2011/0081964 A1 Apr. 7, 2011

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2018.01) |
| ***G07F 17/32*** | (2006.01) |

(52) U.S. Cl.

CPC ...... *G07F 17/3202* (2013.01); *G07F 17/3244* (2013.01)

(58) Field of Classification Search

CPC ............... G07F 17/3267; G07F 17/326; G07F 17/3202; G07F 17/3244

USPC ............................................... 463/20, 21, 30

See application file for complete search history.

(56) References Cited

U.S. PATENT DOCUMENTS

| | | |
|---|---|---|
| 2,669,389 A | 2/1954 | Mesi et al. |
| 3,124,355 A | 3/1964 | Mentzer et al. |
| 3,124,674 A | 3/1964 | Edward et al. |
| 3,684,290 A | 8/1972 | Wayne |
| 3,727,213 A | 4/1973 | Kurtenbach |

(Continued)

FOREIGN PATENT DOCUMENTS

| | | |
|---|---|---|
| EP | 0 141 264 A2 | 5/1985 |
| EP | 0 896 304 A2 | 2/1999 |

(Continued)

OTHER PUBLICATIONS

Acres, John, The Future of Gaming, Where will You be in 10 Years?, Slot Operations Management / Casino Enterprise Management, Jul. 2007, pp. 8-10, 12.

(Continued)

*Primary Examiner* — Omkar Deodhar
*Assistant Examiner* — Wei Lee
(74) *Attorney, Agent, or Firm* — Marger Johnson

(57) ABSTRACT

Embodiments of the present invention are directed to gaming devices and methods for implementing mystery bonus results in place of base game results on a gaming display. The gaming device comprises a base game having a base game display. A random number generator is optionally operable with the base game to obtain a base game result, and the base game display operative to display the base game result. A base game pay table is tied to the base game result and includes winning outcomes and non-winning outcomes. A bonus game award mechanism is configured to determine a threshold tied to a bonus result, track play of the base game, advance a counter responsive to play at the base game, display the bonus result at the base game display in place of the base game result when the counter bears a predefined relationship with the threshold, and award a bonus to a player.

19 Claims, 22 Drawing Sheets

(56) References Cited

U.S. PATENT DOCUMENTS

| | | | | |
|---|---|---|---|---|
| 3,751,040 | A | 8/1973 | Carey | |
| 4,240,635 | A * | 12/1980 | Brown | 463/20 |
| 4,254,404 | A | 3/1981 | White | |
| 4,433,844 | A | 2/1984 | Hooker et al. | |
| 4,624,459 | A * | 11/1986 | Kaufman | 463/20 |
| 4,657,256 | A * | 4/1987 | Okada | 463/21 |
| 4,669,731 | A * | 6/1987 | Clarke | 463/20 |
| 4,836,546 | A | 6/1989 | DiRe et al. | |
| 4,887,813 | A | 12/1989 | Chiles, III et al. | |
| 5,022,653 | A | 6/1991 | Suttle et al. | |
| 5,024,439 | A | 6/1991 | Okada | |
| 5,027,102 | A | 6/1991 | Sweeny | |
| 5,031,914 | A | 7/1991 | Rosenthal | |
| 5,078,405 | A | 1/1992 | Jones et al. | |
| 5,152,529 | A | 10/1992 | Okada | |
| 5,178,395 | A | 1/1993 | Lovell | |
| 5,221,083 | A | 6/1993 | Dote | |
| 5,265,880 | A | 11/1993 | Maksymec | |
| 5,342,049 | A | 8/1994 | Wichinsky et al. | |
| 5,364,104 | A | 11/1994 | Jones et al. | |
| 5,377,973 | A | 1/1995 | Jones et al. | |
| 5,380,008 | A * | 1/1995 | Mathis et al. | 463/18 |
| 5,490,670 | A | 2/1996 | Hobert | |
| 5,536,016 | A | 7/1996 | Thompson | |
| 5,564,700 | A | 10/1996 | Celona | |
| 5,584,485 | A | 12/1996 | Jones et al. | |
| 5,586,766 | A | 12/1996 | Forte et al. | |
| 5,655,961 | A | 8/1997 | Acres et al. | |
| 5,674,128 | A | 10/1997 | Holch et al. | |
| 5,695,402 | A | 12/1997 | Stupak | |
| 5,697,844 | A | 12/1997 | Kohorn | |
| 5,743,798 | A | 4/1998 | Adams et al. | |
| 5,758,875 | A | 6/1998 | Giacalone, Jr. | |
| 5,766,076 | A | 6/1998 | Pease et al. | |
| 5,816,918 | A | 10/1998 | Kelly et al. | |
| 5,830,064 | A | 11/1998 | Bradish et al. | |
| 5,836,816 | A | 11/1998 | Bruin et al. | |
| 5,836,817 | A | 11/1998 | Acres et al. | |
| 5,851,147 | A | 12/1998 | Stupak et al. | |
| 5,910,048 | A * | 6/1999 | Feinberg | 463/25 |
| 5,913,726 | A | 6/1999 | Jones et al. | |
| 5,934,998 | A | 8/1999 | Forte et al. | |
| 5,941,770 | A | 8/1999 | Miers et al. | |
| 5,960,406 | A | 9/1999 | Rasansky et al. | |
| 5,984,779 | A | 11/1999 | Bridgeman et al. | |
| 6,003,013 | A | 12/1999 | Boushy et al. | |
| 6,012,983 | A | 1/2000 | Walker et al. | |
| 6,024,642 | A | 2/2000 | Stupak | |
| 6,030,109 | A | 2/2000 | Lobsenz | |
| 6,032,955 | A | 3/2000 | Luciano et al. | |
| 6,045,130 | A | 4/2000 | Jones et al. | |
| 6,048,272 | A | 4/2000 | Tsujita | |
| 6,059,659 | A | 5/2000 | Busch et al. | |
| 6,077,163 | A | 6/2000 | Walker et al. | |
| 6,086,477 | A | 7/2000 | Walker et al. | |
| 6,106,395 | A | 8/2000 | Begis | |
| 6,110,041 | A | 8/2000 | Walker et al. | |
| 6,110,043 | A | 8/2000 | Olsen | |
| 6,135,884 | A | 10/2000 | Hedrick et al. | |
| 6,146,273 | A | 11/2000 | Olsen | |
| 6,165,071 | A | 12/2000 | Weiss | |
| 6,168,521 | B1 | 1/2001 | Luciano et al. | |
| 6,183,362 | B1 | 2/2001 | Boushy | |
| 6,186,892 | B1 | 2/2001 | Frank et al. | |
| 6,186,893 | B1 | 2/2001 | Walker et al. | |
| 6,196,918 | B1 | 3/2001 | Miers et al. | |
| 6,210,276 | B1 * | 4/2001 | Mullins | 463/27 |
| 6,217,448 | B1 | 4/2001 | Olsen | |
| 6,224,482 | B1 | 5/2001 | Bennett | |
| 6,234,900 | B1 | 5/2001 | Cumbers | |
| 6,254,483 | B1 | 7/2001 | Acres | |
| 6,264,560 | B1 | 7/2001 | Goldberg et al. | |
| 6,270,409 | B1 | 8/2001 | Shuster | |
| 6,289,382 | B1 | 9/2001 | Bowman-Amuah | |
| 6,293,866 | B1 | 9/2001 | Walker et al. | |
| 6,293,868 | B1 | 9/2001 | Bernard | |
| 6,302,793 | B1 | 10/2001 | Fertitta, III et al. | |
| 6,315,662 | B1 | 11/2001 | Jorasch et al. | |
| 6,315,666 | B1 | 11/2001 | Mastera et al. | |
| 6,319,122 | B1 | 11/2001 | Packes et al. | |
| 6,319,125 | B1 | 11/2001 | Acres | |
| 6,336,859 | B2 | 1/2002 | Jones et al. | |
| 6,347,996 | B1 | 2/2002 | Gilmore et al. | |
| 6,364,314 | B1 | 4/2002 | Canterbury | |
| 6,364,768 | B1 | 4/2002 | Acres et al. | |
| 6,368,216 | B1 | 4/2002 | Hedrick | |
| 6,371,852 | B1 | 4/2002 | Acres | |
| 6,375,567 | B1 * | 4/2002 | Acres | 463/25 |
| 6,425,823 | B1 | 7/2002 | Byrne | |
| 6,428,002 | B1 | 8/2002 | Baranauskas | |
| 6,443,356 | B1 | 9/2002 | Gajor | |
| 6,443,456 | B1 | 9/2002 | Gajor | |
| 6,454,648 | B1 | 9/2002 | Kelly et al. | |
| 6,457,045 | B1 | 9/2002 | Hanson et al. | |
| 6,471,588 | B2 | 10/2002 | Sakamoto | |
| 6,485,367 | B1 | 11/2002 | Joshi | |
| 6,485,368 | B2 | 11/2002 | Jones et al. | |
| 6,520,856 | B1 | 2/2003 | Walker et al. | |
| 6,537,150 | B1 | 3/2003 | Luciano et al. | |
| 6,565,434 | B1 | 5/2003 | Acres | |
| 6,565,436 | B1 | 5/2003 | Baerlocher | |
| 6,569,013 | B1 | 5/2003 | Taylor | |
| 6,575,832 | B1 | 6/2003 | Manfredi et al. | |
| 6,592,457 | B1 | 7/2003 | Frohm et al. | |
| 6,599,186 | B1 | 7/2003 | Walker et al. | |
| 6,599,193 | B2 * | 7/2003 | Baerlocher et al. | 463/27 |
| 6,606,615 | B1 | 8/2003 | Jennings et al. | |
| 6,620,046 | B2 | 9/2003 | Rowe | |
| 6,634,922 | B1 | 10/2003 | Driscoll et al. | |
| 6,648,757 | B1 | 11/2003 | Slomiany et al. | |
| 6,652,378 | B2 | 11/2003 | Cannon et al. | |
| 6,656,047 | B1 | 12/2003 | Tarantino et al. | |
| 6,695,700 | B2 | 2/2004 | Walker et al. | |
| 6,697,165 | B2 | 2/2004 | Wakai et al. | |
| 6,702,670 | B2 | 3/2004 | Jasper et al. | |
| 6,709,331 | B2 | 3/2004 | Berman | |
| 6,712,693 | B1 | 3/2004 | Hettinger | |
| 6,712,695 | B2 | 3/2004 | Mothwurf et al. | |
| 6,722,985 | B2 | 4/2004 | Criss-Puszkiewicz et al. | |
| 6,749,510 | B2 | 6/2004 | Giobbi | |
| 6,751,657 | B1 | 6/2004 | Zothner | |
| 6,755,420 | B2 | 6/2004 | Colton | |
| 6,758,754 | B1 | 7/2004 | Lavanchy et al. | |
| 6,760,595 | B2 | 7/2004 | Inselberg | |
| 6,780,104 | B2 | 8/2004 | Fox | |
| 6,786,824 | B2 | 9/2004 | Cannon | |
| 6,800,026 | B2 | 10/2004 | Cannon | |
| 6,800,027 | B2 | 10/2004 | Giobbi et al. | |
| 6,802,778 | B1 | 10/2004 | Lemay et al. | |
| 6,811,482 | B2 | 11/2004 | Letvosky | |
| 6,811,486 | B1 | 11/2004 | Luciano, Jr. | |
| 6,860,808 | B2 | 3/2005 | Levitan | |
| 6,860,810 | B2 | 3/2005 | Cannon et al. | |
| 6,939,227 | B2 | 9/2005 | Jorasch et al. | |
| 6,944,509 | B2 | 9/2005 | Altmaier et al. | |
| 6,948,171 | B2 | 9/2005 | Dan et al. | |
| 6,965,868 | B1 | 11/2005 | Bednarek | |
| 6,973,665 | B2 | 12/2005 | Dudkiewicz et al. | |
| RE38,982 | E | 2/2006 | Forte et al. | |
| 6,997,380 | B2 | 2/2006 | Safaei et al. | |
| 6,998,806 | B2 | 2/2006 | Suzuki | |
| 7,037,195 | B2 | 5/2006 | Schneider et al. | |
| 7,048,628 | B2 | 5/2006 | Schneider | |
| 7,056,210 | B2 | 6/2006 | Bansemer et al. | |
| 7,069,232 | B1 | 6/2006 | Fox et al. | |
| 7,090,579 | B2 | 8/2006 | Tarantino | |
| 7,094,149 | B2 | 8/2006 | Walker et al. | |
| 7,094,150 | B2 | 8/2006 | Ungaro et al. | |
| 7,103,560 | B1 | 9/2006 | Fox et al. | |
| 7,131,908 | B2 | 11/2006 | Baerlocher | |
| 7,144,322 | B2 | 12/2006 | Gomez et al. | |
| 7,169,052 | B2 | 1/2007 | Beaulieu et al. | |
| 7,175,521 | B2 | 2/2007 | McClintic | |
| 7,182,690 | B2 | 2/2007 | Giobbi et al. | |

(56) References Cited

U.S. PATENT DOCUMENTS

| | | | |
|---|---|---|---|
| 7,184,965 | B2 | 2/2007 | Fox et al. |
| 7,186,181 | B2 | 3/2007 | Rowe |
| 7,192,346 | B2 | 3/2007 | Mathis |
| 7,195,243 | B2 | 3/2007 | Kenny et al. |
| 7,201,654 | B1 | 4/2007 | Jarvis et al. |
| 7,251,805 | B2 | 7/2007 | Koo |
| 7,300,351 | B2 * | 11/2007 | Thomas .......................... 463/20 |
| 7,329,185 | B2 | 2/2008 | Conover et al. |
| 7,338,372 | B2 | 3/2008 | Morrow et al. |
| 7,361,089 | B2 | 4/2008 | Daly et al. |
| 7,374,486 | B2 | 5/2008 | Baerlocher |
| 7,416,186 | B2 | 8/2008 | Walker et al. |
| 7,458,892 | B2 | 12/2008 | Walker et al. |
| 7,559,837 | B1 * | 7/2009 | Yoseloff .............. G07F 17/3265 273/143 R |
| 7,594,851 | B2 | 9/2009 | Falconer |
| 7,601,060 | B2 * | 10/2009 | Baerlocher et al. ............ 463/20 |
| 7,628,691 | B2 | 12/2009 | Luciano et al. |
| 7,674,180 | B2 | 3/2010 | Graham et al. |
| 7,704,137 | B2 | 4/2010 | Englman |
| 7,717,788 | B2 | 5/2010 | Rowe |
| 7,765,121 | B2 | 7/2010 | Pace et al. |
| 7,775,875 | B2 | 8/2010 | Nguyen et al. |
| 7,775,876 | B2 | 8/2010 | Rowe |
| 7,780,520 | B2 * | 8/2010 | Baerlocher ..................... 463/25 |
| 7,811,167 | B2 | 10/2010 | Giobbi et al. |
| 7,846,018 | B2 | 12/2010 | Baerlocher |
| 7,857,693 | B1 | 12/2010 | Johnson et al. |
| 7,874,911 | B2 | 1/2011 | Walker et al. |
| 7,963,844 | B2 | 6/2011 | Walker et al. |
| 8,062,124 | B2 | 11/2011 | Jaffe |
| 8,545,319 | B2 | 10/2013 | Kaneko |
| 2001/0004609 | A1 | 6/2001 | Walker et al. |
| 2001/0024015 | A1 | 9/2001 | Hogan et al. |
| 2001/0046893 | A1 | 11/2001 | Giobbi et al. |
| 2001/0048193 | A1 | 12/2001 | Yoseloff et al. |
| 2002/0013173 | A1 | 1/2002 | Walker et al. |
| 2002/0016202 | A1 | 2/2002 | Fertitta et al. |
| 2002/0019253 | A1 | 2/2002 | Reitzen et al. |
| 2002/0032052 | A1 | 3/2002 | Levitan |
| 2002/0034981 | A1 | 3/2002 | Hisada |
| 2002/0039923 | A1 | 4/2002 | Cannon et al. |
| 2002/0055381 | A1 | 5/2002 | Tarantino |
| 2002/0086726 | A1 | 7/2002 | Ainsworth |
| 2002/0094855 | A1 | 7/2002 | Berman |
| 2002/0103018 | A1 | 8/2002 | Rommerdahl et al. |
| 2002/0107072 | A1 | 8/2002 | Giobbi |
| 2002/0123376 | A1 | 9/2002 | Walker et al. |
| 2002/0132664 | A1 | 9/2002 | Miller et al. |
| 2002/0142825 | A1 | 10/2002 | Lark et al. |
| 2002/0143652 | A1 | 10/2002 | Beckett |
| 2002/0147040 | A1 | 10/2002 | Walker et al. |
| 2002/0147043 | A1 | 10/2002 | Shulman et al. |
| 2002/0152120 | A1 | 10/2002 | Howington |
| 2002/0167126 | A1 | 11/2002 | De Raedt et al. |
| 2002/0177480 | A1 | 11/2002 | Rowe |
| 2002/0177483 | A1 | 11/2002 | Cannon |
| 2002/0187834 | A1 | 12/2002 | Rowe et al. |
| 2002/0193162 | A1 | 12/2002 | Walker et al. |
| 2003/0003989 | A1 | 1/2003 | Johnson |
| 2003/0013512 | A1 | 1/2003 | Rowe |
| 2003/0032474 | A1 | 2/2003 | Kaminkow |
| 2003/0036425 | A1 | 2/2003 | Kaminkow et al. |
| 2003/0054875 | A1 | 3/2003 | Marks et al. |
| 2003/0054878 | A1 | 3/2003 | Bonoy et al. |
| 2003/0054881 | A1 | 3/2003 | Hedrick et al. |
| 2003/0060276 | A1 * | 3/2003 | Walker et al. .................. 463/25 |
| 2003/0064769 | A1 | 4/2003 | Muir |
| 2003/0064771 | A1 | 4/2003 | Morrow et al. |
| 2003/0067116 | A1 | 4/2003 | Colton |
| 2003/0078101 | A1 | 4/2003 | Schneider et al. |
| 2003/0083943 | A1 | 5/2003 | Adams et al. |
| 2003/0087685 | A1 | 5/2003 | Hogan et al. |
| 2003/0092484 | A1 | 5/2003 | Schneider et al. |
| 2003/0100360 | A1 | 5/2003 | Manfredi et al. |
| 2003/0114217 | A1 | 6/2003 | Walker et al. |
| 2003/0119575 | A1 | 6/2003 | Centuori et al. |
| 2003/0135304 | A1 | 7/2003 | Sroub et al. |
| 2003/0144048 | A1 | 7/2003 | Silva |
| 2003/0178774 | A1 | 9/2003 | Marcilio |
| 2003/0186733 | A1 | 10/2003 | Wolf et al. |
| 2003/0187736 | A1 | 10/2003 | Teague et al. |
| 2003/0190944 | A1 | 10/2003 | Manfredi et al. |
| 2003/0195029 | A1 | 10/2003 | Frohm et al. |
| 2003/0199295 | A1 | 10/2003 | Vancura |
| 2003/0199312 | A1 | 10/2003 | Walker et al. |
| 2003/0204474 | A1 | 10/2003 | Capek et al. |
| 2003/0207711 | A1 | 11/2003 | Rowe |
| 2003/0209853 | A1 | 11/2003 | Harris |
| 2003/0211884 | A1 | 11/2003 | Gauselmann |
| 2003/0216169 | A1 | 11/2003 | Walker et al. |
| 2003/0220138 | A1 | 11/2003 | Walker et al. |
| 2003/0220139 | A1 | 11/2003 | Peterson |
| 2003/0220143 | A1 | 11/2003 | Shteyn et al. |
| 2003/0228901 | A1 | 12/2003 | Walker et al. |
| 2003/0232640 | A1 | 12/2003 | Walker et al. |
| 2003/0234489 | A1 | 12/2003 | Okada |
| 2003/0236110 | A1 | 12/2003 | Beaulieu et al. |
| 2004/0002377 | A1 * | 1/2004 | Staw et al. ...................... 463/25 |
| 2004/0009808 | A1 | 1/2004 | Gauselmann |
| 2004/0029631 | A1 | 2/2004 | Duhamel |
| 2004/0038735 | A1 | 2/2004 | Steil et al. |
| 2004/0038736 | A1 | 2/2004 | Bryant et al. |
| 2004/0048650 | A1 | 3/2004 | Mierau et al. |
| 2004/0053657 | A1 | 3/2004 | Fiden et al. |
| 2004/0053681 | A1 | 3/2004 | Jordan et al. |
| 2004/0063484 | A1 | 4/2004 | Dreaper et al. |
| 2004/0072609 | A1 | 4/2004 | Ungaro et al. |
| 2004/0103013 | A1 | 5/2004 | Jameson |
| 2004/0121833 | A1 | 6/2004 | Mezen et al. |
| 2004/0142742 | A1 | 7/2004 | Schneider et al. |
| 2004/0158536 | A1 | 8/2004 | Kowal et al. |
| 2004/0166940 | A1 | 8/2004 | Rothschild |
| 2004/0180722 | A1 | 9/2004 | Giobbi |
| 2004/0198485 | A1 | 10/2004 | Loose et al. |
| 2004/0203611 | A1 | 10/2004 | Laporta et al. |
| 2004/0204213 | A1 | 10/2004 | Schugar et al. |
| 2004/0204216 | A1 | 10/2004 | Schugar |
| 2004/0204222 | A1 | 10/2004 | Roberts |
| 2004/0214637 | A1 * | 10/2004 | Nonaka ........................... 463/31 |
| 2004/0219967 | A1 | 11/2004 | Giobbi et al. |
| 2004/0224750 | A1 | 11/2004 | Al-Ziyoud |
| 2004/0229671 | A1 | 11/2004 | Stronach et al. |
| 2004/0229683 | A1 | 11/2004 | Mothwurf et al. |
| 2004/0229700 | A1 | 11/2004 | Cannon et al. |
| 2004/0235542 | A1 | 11/2004 | Stronach et al. |
| 2004/0248642 | A1 | 12/2004 | Rothschild |
| 2004/0254010 | A1 | 12/2004 | Fine |
| 2004/0266517 | A1 * | 12/2004 | Bleich et al. ................... 463/20 |
| 2005/0014558 | A1 | 1/2005 | Estey |
| 2005/0026674 | A1 | 2/2005 | Wolf et al. |
| 2005/0043072 | A1 | 2/2005 | Nelson |
| 2005/0043088 | A1 | 2/2005 | Nguyen et al. |
| 2005/0043092 | A1 | 2/2005 | Gauselmann |
| 2005/0043094 | A1 | 2/2005 | Nguyen et al. |
| 2005/0049028 | A1 | 3/2005 | Gornez et al. |
| 2005/0054438 | A1 | 3/2005 | Rothschild et al. |
| 2005/0059467 | A1 | 3/2005 | Saffari et al. |
| 2005/0070356 | A1 | 3/2005 | Mothwurf et al. |
| 2005/0075164 | A1 | 4/2005 | Krynicky |
| 2005/0096121 | A1 | 5/2005 | Gilliland et al. |
| 2005/0096124 | A1 | 5/2005 | Stronach |
| 2005/0101375 | A1 | 5/2005 | Webb et al. |
| 2005/0101379 | A1 | 5/2005 | Falconer |
| 2005/0119052 | A1 | 6/2005 | Russell et al. |
| 2005/0124411 | A1 * | 6/2005 | Schneider et al. .............. 463/29 |
| 2005/0124415 | A1 | 6/2005 | Centuori et al. |
| 2005/0148380 | A1 | 7/2005 | Cannon et al. |
| 2005/0148383 | A1 | 7/2005 | Mayeroff |
| 2005/0153773 | A1 | 7/2005 | Nguyen et al. |
| 2005/0164764 | A1 | 7/2005 | Ghaly |
| 2005/0181856 | A1 | 8/2005 | Cannon et al. |
| 2005/0181860 | A1 | 8/2005 | Nguyen et al. |
| 2005/0181862 | A1 | 8/2005 | Ashter et al. |

(56) References Cited

U.S. PATENT DOCUMENTS

2005/0187014 A1 8/2005 Saffari et al.
2005/0192080 A1* 9/2005 Cote ................... G07F 17/3265 463/17
2005/0208995 A1 9/2005 Marshall et al.
2005/0215311 A1 9/2005 Hornik et al.
2005/0215314 A1 9/2005 Schneider et al.
2005/0215316 A1 9/2005 Rowe et al.
2005/0233794 A1 10/2005 Cannon et al.
2005/0239541 A1 10/2005 Jorasch et al.
2005/0239545 A1 10/2005 Rowe
2005/0251440 A1 11/2005 Bednarek
2005/0255902 A1 11/2005 Lind
2005/0266905 A1 12/2005 Emori et al.
2006/0009284 A1 1/2006 Schwartz et al.
2006/0025205 A1 2/2006 Casey et al.
2006/0025207 A1 2/2006 Walker et al.
2006/0025210 A1* 2/2006 Johnson .......................... 463/25
2006/0030391 A1 2/2006 Casey et al.
2006/0030400 A1 2/2006 Mathis
2006/0040723 A1 2/2006 Baerlocher et al.
2006/0040730 A1 2/2006 Walker et al.
2006/0046830 A1 3/2006 Webb
2006/0046835 A1 3/2006 Walker et al.
2006/0052160 A1 3/2006 Saffari et al.
2006/0058095 A1 3/2006 Berman et al.
2006/0058097 A1 3/2006 Berman et al.
2006/0063578 A1 3/2006 Bansemer et al.
2006/0068898 A1 3/2006 Maya
2006/0068899 A1 3/2006 White et al.
2006/0068903 A1 3/2006 Walker et al.
2006/0073872 A1 4/2006 B-Jensen et al.
2006/0073887 A1 4/2006 Nguyen et al.
2006/0079310 A1 4/2006 Friedman et al.
2006/0079314 A1 4/2006 Walker et al.
2006/0084496 A1 4/2006 Jaffe et al.
2006/0094493 A1 5/2006 Kido
2006/0100009 A1 5/2006 Walker et al.
2006/0105836 A1 5/2006 Walker et al.
2006/0116201 A1 6/2006 Gauselmann
2006/0121972 A1 6/2006 Walker et al.
2006/0128467 A1 6/2006 Thomas
2006/0135249 A1 6/2006 Seelig et al.
2006/0148559 A1 7/2006 Jordan et al.
2006/0149632 A1 7/2006 Register et al.
2006/0154714 A1 7/2006 Montross et al.
2006/0174270 A1 8/2006 Westberg et al.
2006/0183530 A1 8/2006 Ellis
2006/0183536 A1 8/2006 Gagner et al.
2006/0189363 A1 8/2006 Strom
2006/0199631 A1 9/2006 McGill et al.
2006/0211486 A1 9/2006 Walker et al.
2006/0217175 A1 9/2006 Walker et al.
2006/0229127 A1 10/2006 Walker et al.
2006/0234791 A1 10/2006 Nguyen et al.
2006/0247034 A1* 11/2006 Schneider et al. .............. 463/26
2006/0247041 A1 11/2006 Walker et al.
2006/0252510 A1 11/2006 Walker et al.
2006/0252512 A1 11/2006 Walker et al.
2006/0252516 A1 11/2006 Walker et al.
2006/0258422 A1* 11/2006 Walker .................... G07F 17/32 463/7
2006/0258425 A1 11/2006 Edidin et al.
2006/0258432 A1 11/2006 Packer et al.
2006/0287034 A1* 12/2006 Englman et al. ............... 463/13
2006/0287045 A1 12/2006 Walker et al.
2006/0287098 A1 12/2006 Morrow et al.
2006/0287102 A1 12/2006 White et al.
2007/0001396 A1 1/2007 Walker et al.
2007/0010309 A1 1/2007 Giobbi et al.
2007/0010315 A1 1/2007 Hein
2007/0050256 A1 3/2007 Walker et al.
2007/0060252 A1 3/2007 Taylor
2007/0060274 A1 3/2007 Rowe et al.
2007/0060323 A1 3/2007 Isaac et al.
2007/0060387 A1 3/2007 Enzminger et al.
2007/0087806 A1 4/2007 Luciano et al.
2007/0105615 A1 5/2007 Lind
2007/0105618 A1 5/2007 Steil
2007/0106553 A1 5/2007 Jordan et al.
2007/0111776 A1 5/2007 Griswold et al.
2007/0112609 A1 5/2007 Howard et al.
2007/0117619 A1 5/2007 Walker et al.
2007/0117623 A1 5/2007 Nelson et al.
2007/0129147 A1 6/2007 Gagner
2007/0135214 A1 6/2007 Walker et al.
2007/0143156 A1 6/2007 van Deursen
2007/0161424 A1* 7/2007 Gatto et al. ..................... 463/20
2007/0167210 A1 7/2007 Kelly et al.
2007/0191087 A1 8/2007 Thomas et al.
2007/0197247 A1 8/2007 Inselberg
2007/0205556 A1 9/2007 Roemer et al.
2007/0259709 A1 11/2007 Kelly et al.
2007/0275777 A1 11/2007 Walker et al.
2007/0293302 A1 12/2007 Lind et al.
2008/0015004 A1 1/2008 Gatto et al.
2008/0039190 A1 2/2008 Walker et al.
2008/0058105 A1 3/2008 Combs et al.
2008/0064495 A1 3/2008 Bryant et al.
2008/0076576 A1 3/2008 Graham et al.
2008/0090651 A1 4/2008 Baerlocher
2008/0102921 A1* 5/2008 Urquhart ......................... 463/20
2008/0102935 A1 5/2008 Finnimore
2008/0113779 A1* 5/2008 Cregan ........................... 463/27
2008/0113811 A1 5/2008 Linard et al.
2008/0125216 A1* 5/2008 Okada ............................ 463/25
2008/0132320 A1 6/2008 Rodgers
2008/0146331 A1 6/2008 Nordman et al.
2008/0153564 A1 6/2008 Baerlocher et al.
2008/0171586 A1* 7/2008 Roemer .......................... 463/16
2008/0176647 A1* 7/2008 Acres ............................. 463/25
2008/0182655 A1 7/2008 DeWaal et al.
2008/0207313 A1* 8/2008 Acres ............................. 463/27
2008/0220840 A1 9/2008 Katz et al.
2008/0234035 A1 9/2008 Malek
2008/0242398 A1 10/2008 Harris et al.
2008/0248851 A1 10/2008 Bloom
2008/0254886 A1 10/2008 Kelly
2008/0261699 A1 10/2008 Topham et al.
2008/0268959 A1 10/2008 Bryson et al.
2008/0293467 A1 11/2008 Mathis
2008/0311973 A1 12/2008 Jaffe
2008/0318656 A1 12/2008 Walker et al.
2009/0005170 A9 1/2009 Kelly et al.
2009/0036202 A1 2/2009 Baerlocher et al.
2009/0070081 A1 3/2009 Saenz et al.
2009/0075728 A1* 3/2009 Acres ............................. 463/25
2009/0088239 A1 4/2009 Iddings et al.
2009/0093289 A1 4/2009 Toyoda
2009/0124327 A1 5/2009 Caputo et al.
2009/0124364 A1 5/2009 Cuddy et al.
2009/0131175 A1 5/2009 Kelly et al.
2009/0170608 A1 7/2009 Herrmann et al.
2009/0176580 A1 7/2009 Herrmann et al.
2009/0239601 A1 9/2009 Macke
2009/0239622 A1* 9/2009 Fujimori et al. ................ 463/20
2009/0239628 A1* 9/2009 Fujimori et al. ................ 463/20
2009/0247284 A1 10/2009 Sugiyama et al.
2009/0253477 A1* 10/2009 Teranishi .......................... 463/9
2009/0253478 A1 10/2009 Walker et al.
2009/0253490 A1* 10/2009 Teranishi ........................ 463/20
2009/0270168 A1 10/2009 Englman et al.
2009/0286590 A1* 11/2009 Bennett ........................... 463/20
2010/0016055 A1 1/2010 Englman et al.
2010/0041464 A1 2/2010 Arezina et al.
2010/0048286 A1* 2/2010 Okada et al. ................... 463/20
2010/0056248 A1 3/2010 Acres
2010/0105454 A1* 4/2010 Weber et al. ..................... 463/1
2010/0105466 A1* 4/2010 Inamura et al. ................ 463/20
2010/0113130 A1* 5/2010 Kamano et al. ................ 463/20
2010/0124981 A1* 5/2010 Kato et al. ....................... 463/20
2010/0124988 A1* 5/2010 Amos et al. .................... 463/27
2010/0210336 A1 8/2010 Berman et al.
2010/0210338 A1 8/2010 Taylor
2010/0304834 A1* 12/2010 Okada ............................ 463/20

(56) References Cited

U.S. PATENT DOCUMENTS

| | | | | |
|---|---|---|---|---|
| 2011/0039615 | A1 | 2/2011 | Acres | |
| 2011/0081958 | A1 | 4/2011 | Herrmann et al. | |
| 2011/0159950 | A1 | 6/2011 | Okada | |
| 2011/0165938 | A1* | 7/2011 | Anderson et al. | 463/25 |
| 2011/0218030 | A1* | 9/2011 | Acres | 463/25 |
| 2011/0275438 | A9 | 11/2011 | Hardy et al. | |
| 2011/0287826 | A1* | 11/2011 | Kato et al. | 463/20 |

FOREIGN PATENT DOCUMENTS

| | | | |
|---|---|---|---|
| EP | 0 896 308 | A1 | 2/1999 |
| EP | 0 919 965 | A2 | 6/1999 |
| EP | 0 981 397 | A1 | 3/2000 |
| EP | 1 091 789 | A1 | 4/2001 |
| EP | 1 231 577 | A2 | 8/2002 |
| EP | 1 351 180 | | 10/2003 |
| EP | 1 369 830 | A1 | 12/2003 |
| EP | 1 490 849 | A2 | 12/2004 |
| EP | 1 496 419 | | 1/2005 |
| EP | 1 623 375 | A1 | 2/2006 |
| EP | 1 637 196 | A1 | 3/2006 |
| EP | 1 832 952 | | 9/2007 |
| JP | 2-21883 | | 1/1990 |
| WO | WO 95/21665 | | 8/1995 |
| WO | WO 95/31262 | | 11/1995 |
| WO | WO 96/35490 | | 11/1996 |
| WO | WO 97/46293 | | 12/1997 |
| WO | WO 00/17825 | | 3/2000 |
| WO | WO 00/32286 | | 6/2000 |
| WO | WO 00/64545 | | 11/2000 |
| WO | WO 01/36059 | A1 | 5/2001 |
| WO | WO 01/59680 | | 8/2001 |
| WO | WO 01/809611 | | 11/2001 |
| WO | WO 03/066179 | A2 | 8/2003 |
| WO | WO 03/089092 | | 10/2003 |
| WO | WO 2005/029279 | A2 | 3/2005 |
| WO | WO 2005/029287 | A2 | 3/2005 |
| WO | WO 2005/099845 | A1 | 10/2005 |
| WO | WO 2005/113093 | A1 | 12/2005 |
| WO | WO 2006/014745 | | 2/2006 |
| WO | WO 2006/014770 | A2 | 2/2006 |
| WO | WO 2006/014990 | A2 | 2/2006 |
| WO | WO 2006/032498 | A1 | 3/2006 |
| WO | WO 2006/036948 | A2 | 4/2006 |
| WO | WO 2006/055518 | A2 | 5/2006 |
| WO | WO 2006/060442 | | 6/2006 |
| WO | WO 2006/060493 | | 6/2006 |
| WO | WO 2007/087286 | | 8/2007 |
| WO | WO 2008/024705 | A2 | 2/2008 |

OTHER PUBLICATIONS

Acres, John, Measuring the Player Experience: What a Squiggly Line Can Tell You, Inside Edge / Slot Manager, Jan./Feb. 2009, pp. 28-29.

Acres, John, An Ingenious Internet Marketing Tool, Slot Operations Management / Casino Enterprise Management, Aug. 2007, pp. 8-10.

"White Paper: An Analysis of Harrah's Total Rewards Program" written and published by Gaming Market Advisor on or before Dec. 31, 2006, retrieved from URL <http://www.gamingmarketadvisors.com/publications/Harrahs%20Total%20Reward%20White%20Paper.pdf>, 41 pages.

* cited by examiner

METHOD AND SYSTEM FOR IMPLEMENTING MYSTERY BONUS IN PLACE OF BASE GAME RESULTS ON GAMING MACHINE

FIELD OF THE INVENTION

This disclosure relates generally to a system and novel methods for implementing results on the base game of a gaming machine display.

BACKGROUND

Playing games of chance is a popular recreational activity. There are many types of games of chance including table games where players wager against a live dealer such as blackjack, Pai Gow, roulette, Baccarat. Other types of games of chance are offered as automated machines. Examples include slots, poker, bingo, etc. Still other types of games of chance allow players to wager against one another, such as a poker table. In return for a wager, games of chance generate randomly determined outcomes, some of which result in a winning event. Games of chance are often played with wagers having financial value but some games of chance are played with points or other freely available currency having no fiscal worth.

Games of chance may be played in casinos, or at home using electronic devices or mechanical equipment. Gambling via Internet, whether for fun or for money, is also a popular activity.

Games of chance typically associate a winning event with a specific game outcome. For example, achievement of BAR-BAR-BAR on the payline of a three reel slot machine might pay 20 credits on a 1 credit wager. Determination of a base game result often involves building a table of possible results on the base game, generating a random number using a random number generator (RNG), comparing the generated number with the results listed in the table, and displaying that result on the base game display as a base game result.

As one example of a base game implementation, a base game has three reels each having 20 reel positions. Symbols appear at each reel position, with the more likely symbols (such as cherries) appearing multiple times and less likely symbols (such as a '7') appearing only once. The reel positions may be reel, as in a physical slot machine reel, or virtual. The three reels thus result in 20*20*20=8,000 possible combinations of reel positions. The chance of receiving a 7-7-7 result may occur only 1:8000 times using the RNG because each '7' appears only once in each reel. At the start of each play, a player uses one or more game credits and pulls the slot machine handle or pushes a button to activate the game. A RNG is then generated from 1 to 8000—say 1,433—which corresponds to the result lemon-BAR-BAR. The base game result is referenced against a look-up table to determine whether the result is a win or a non-win. In this case, the lemon-bar-bar corresponds to a non-winning result. Zero credits would thus be paid out to the player.

One drawback to a random result-oriented base game is that winning results are completely unpredictable. That is, the chance of a winning result is the same after each play. With random results such as those using typical RNG-based games, there is the chance that a player will not obtain a winning result of a long time. When this happens, a player may become discouraged and never choose to play again. Further, many players grow frustrated if there is a long period of play between wins. Other players prefer to have longer periods between winning events but to have winning events that are larger or occur in clusters.

Accordingly, it would be desirable for the casino to be able to configure the timing of an award at the base game to coincide with player preferences to maintain their interest, while conforming to the payback percentage of the gaming machine per applicable gaming regulations.

DETAILED DESCRIPTION

To increase player interest, bonus awards which are won independently of any single game outcome are sometimes offered. The "mystery" bonus is a popular bonus award that is so named because players cannot easily discern why the award occurred, as it may be completely independent of the game's normal schedule of payments.

Mystery bonuses are awarded as a function of game play and are increasingly likely to be won with each game played. In one aspect, the mystery award is a progressive amount because it grows in value as a function of each wager made until it is won. Other mystery awards, such as those winnable using methods described herein, do not grow with each play, but rather are set amounts triggered after a certain number of plays (the "count"). Once won, the award and/or count can be initialized to a starting value and the process begun again. Alternately, the count continuously progresses with various awards triggered at various count points as described further below and particularly with reference to FIG. 8.

Further, many players grow frustrated if there is a long period of play between wins. Other players prefer to have longer periods between winning events but to have winning events that are larger or occur in clusters. It would be desirable for the casino to be able to configure the timing of the next mystery bonus award. It would also be desirable to associate a frequency of awarding the mystery bonus to base game outcomes, for example, or to associate the frequency of awarding the mystery bonus to payout percentages of the base game.

Players would enjoy a heightened sense of entertainment if they know that an award is won before the winner identity and bonus amount won are revealed. Furthermore, in mystery bonus awards that are a function of wagers made, it would be useful to illustrate that larger wagers have a greater likelihood of winning, and it would heighten player enjoyment to have an indication of how likely the next mystery award is of being won. Additionally, players would enjoy a heightened sense of entertainment if they know that an award is won before the winner identity and bonus amount won are revealed.

Figure 1A:
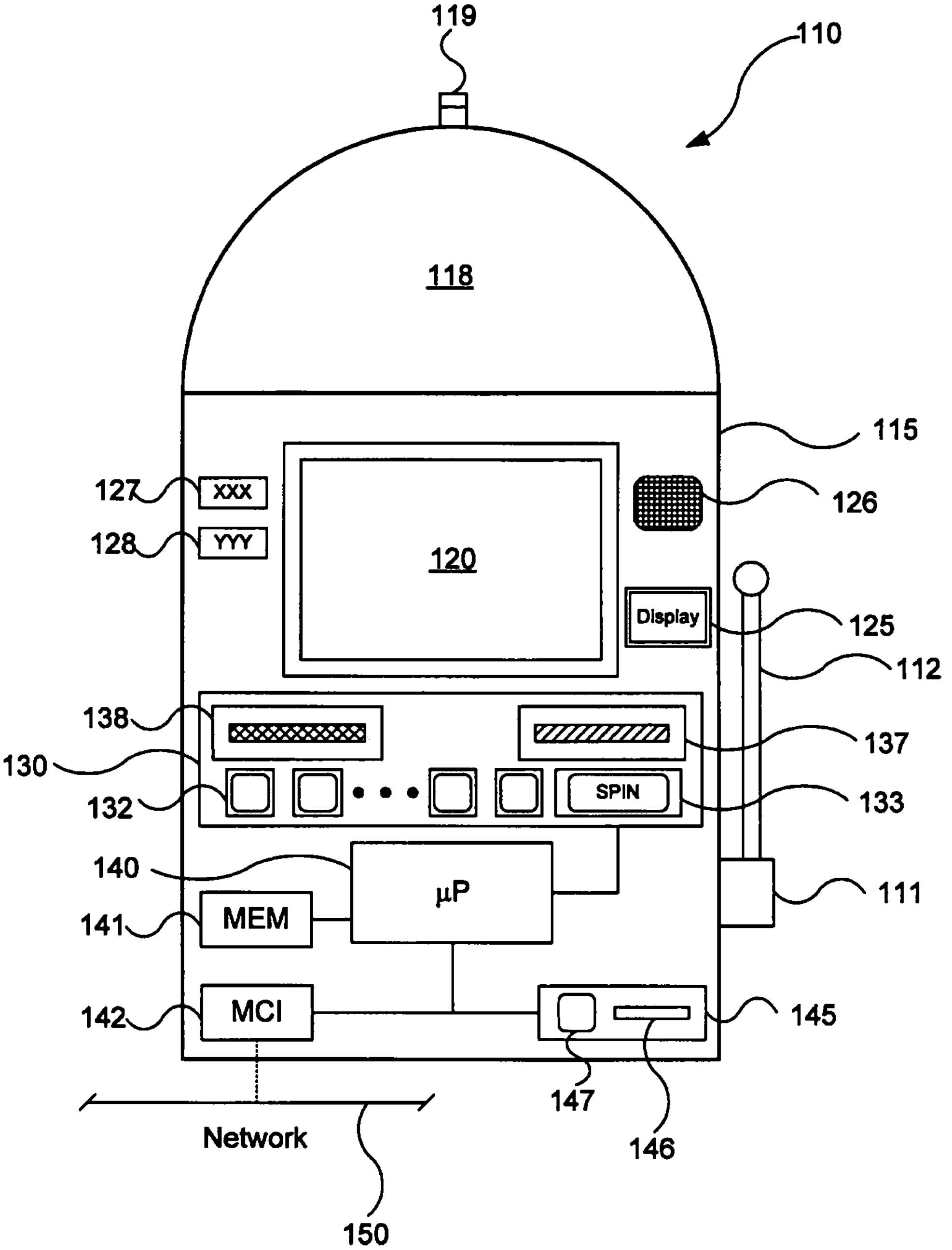
FIG. 1A is a functional block diagram that illustrates a gaming device according to embodiments of the invention.
Figure 1B:
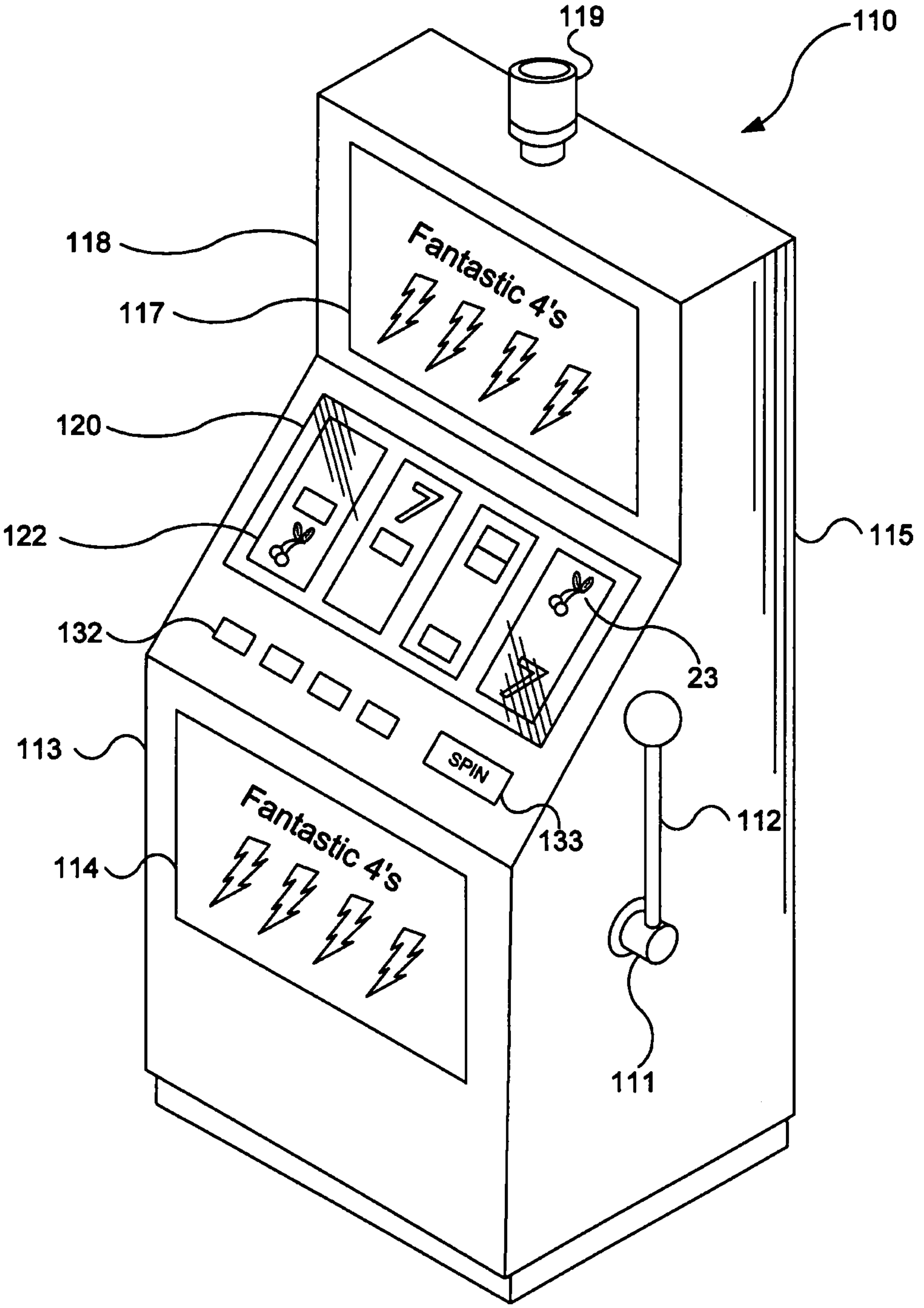
FIG. 1B is an isometric view of the gaming device illustrated in FIG. 1A.

FIGS. 1A and 1B illustrate example gaming devices according to embodiments of the invention.

Referring to FIGS. 1A and 1B, a gaming device 110 is an electronic gaming machine. Although an electronic gaming machine or "slot" machine is illustrated, various other types of devices may be used to wager monetarily based credits on a game of chance in accordance with principles of the invention. The term "electronic gaming device" is meant to include various devices such as electro-mechanical spinning-reel type slot machines, video slot machines, and video poker machines, for instance. Other gaming devices may include computer-based gaming machines, wireless gaming devices, multi-player gaming stations, modified personal electronic gaming devices (such as cell phones), personal computers, server-based gaming terminals, and other similar devices. Although embodiments of the invention will work with all of the gaming types mentioned, for ease of illustration the present embodiments will be described in reference to the electronic gaming machine 110 shown in FIGS. 1A and 1B.

The gaming device 110 includes a cabinet 115 housing components to operate the gaming device 110. The cabinet 115 may include a gaming display 120, a base portion 113, a top box 118, and a player interface panel 130. The gaming display 120 may include mechanical spinning reels (FIG. 2A), a video display (FIGS. 2B and 2C), or a combination of both spinning reels and a video display (not shown). The gaming cabinet 115 may also include a credit meter 127 and a coin-in or bet meter 128. The credit meter 127 may indicate the total number of credits remaining on the gaming device 10 that are eligible to be wagered. In some embodiments, the credit meter 127 may reflect a monetary unit, such as dollars. However, it is often preferable to have the credit meter 127 reflect a number of 'credits,' rather than a monetary unit. The bet meter 128 may indicate the amount of credits to be wagered on a particular game. Thus, for each game, the player transfers the amount that he or she wants to wager from the credit meter 127 to the bet meter 128. In some embodiments, various other meters may be present, such as meters reflecting amounts won, amounts paid, or the like. In embodiments where the gaming display 120 is a video monitor, the information indicated on the credit meters may be shown on the gaming display itself 120 (FIG. 2B).

The base portion 113 may include a lighted panel 114, a coin return (not shown), and a gaming handle 112 operable on a partially rotating pivot joint 111. The game handle 112 is traditionally included on mechanical spinning-reel games, where the handle may be pulled toward a player to initiate the spinning of reels 122 after placement of a wager. The top box 118 may include a lighted panel 117, a video display (such as an LCD monitor), a mechanical bonus device (not shown), and a candle light indicator 119. The player interface panel 130 may include various devices so that a player can interact with the gaming device 110.

The player interface panel 130 may include one or more game buttons 132 that can be actuated by the player to cause the gaming device 110 to perform a specific action. For example, some of the game buttons 132 may cause the gaming device 110 to bet a credit to be wagered during the next game, change the number of lines being played on a multi-line game, cash out the credits remaining on the gaming device (as indicated on the credit meter 127), or request assistance from casino personnel, such as by lighting the candle 119. In addition, the player interface panel 130 may include one or more game actuating buttons 133. The game actuating buttons 133 may initiate a game with a pre-specified amount of credits. On some gaming devices 110 a "Max Bet" game actuating button 133 may be included that places the maximum credit wager on a game and initiates the game. The player interface panel 130 may further include a bill acceptor 137 and a ticket printer 138. The bill acceptor 137 may accept and validate paper money or previously printed tickets with a credit balance. The ticket printer 138 may print out tickets reflecting the balance of the credits that remain on the gaming device 110 when a player cashes out by pressing one of the game buttons 132 programmed to cause a 'cashout.' These tickets may be inserted into other gaming machines or redeemed at a cashier station or kiosk for cash.

The gaming device 110 may also include one or more speakers 126 to transmit auditory information or sounds to the player. The auditory information may include specific sounds associated with particular events that occur during game play on the gaming device 110. For example, a particularly festive sound may be played during a large win or when a bonus is triggered. The speakers 126 may also transmit "attract" sounds to entice nearby players when the game is not currently being played.

The gaming device 110 may further include a secondary display 125. This secondary display 125 may be a vacuum fluorescent display (VFD), a liquid crystal display (LCD), a cathode ray tube (CRT), a plasma screen, or the like. The secondary display 125 may show any combination of primary game information and ancillary information to the player. For example, the secondary display 125 may show player tracking information, secondary bonus information, advertisements, or player selectable game options.

The gaming device 110 may include a separate information window (not shown) dedicated to supplying any combination of information related to primary game play, secondary bonus information, player tracking information, secondary bonus information, advertisements or player selectable game options. This window may be fixed in size and location or may have its size and location vary temporally as communication needs change. One example of such a resizable window is International Game Technology's "service window". Another example is Las Vegas Gaming Incorporated's retrofit technology which allows information to be placed over areas of the game or the secondary display screen at various times and in various situations.

The gaming device 110 includes a microprocessor 140 that controls operation of the gaming device 110. If the gaming device 110 is a standalone gaming device, the microprocessor 140 may control virtually all of the operations of the gaming devices and attached equipment, such as operating game logic stored in memory (not shown) as firmware, controlling the display 120 to represent the outcome of a game, communicating with the other peripheral devices (such as the bill acceptor 137), and orchestrating the lighting and sound emanating from the gaming device 110. In other embodiments where the gaming device 110 is coupled to a network 150, as described below, the microprocessor 140 may have different tasks depending on the setup and function of the gaming device. For example, the microprocessor 140 may be responsible for running the base game of the gaming device and executing instructions received over the network 150 from a bonus server or player tracking server. In a server-based gaming setup, the microprocessor 140 may act as a terminal to execute instructions from a remote server that is running game play on the gaming device.

The microprocessor 140 may be coupled to a machine communication interface (MCI) 142 that connects the gaming device 110 to a gaming network 150. The MCI 142 may be coupled to the microprocessor 140 through a serial connection, a parallel connection, an optical connection, or in some cases a wireless connection. The gaming device 110 may include memory 141 (MEM), such as a random access memory (RAM), coupled to the microprocessor 140 and which can be used to store gaming information, such as storing total coin-in statistics about a present or past gaming session, which can be communicated to a remote server or database through the MCI 142. The MCI 142 may also facilitate communication between the network 150 and the secondary display 125 or a player tracking unit 145 housed in the gaming cabinet 115.

The player tracking unit 145 may include an identification device 146 and one or more buttons 147 associated with the player tracking unit 145. The identification device 146 serves to identify a player, by, for example, reading a player-tracking device, such as a player tracking card that is issued by the casino to individual players who choose to have such a card. The identification device 146 may instead, or additionally, identify players through other methods. Player tracking systems using player tracking cards and card readers 146 are known in the art. Briefly summarizing such a system, a player registers with the casino prior to commencing gaming. The casino issues a unique player-tracking card to the player and opens a corresponding player account that is stored on a server or host computer, described below with reference to FIG. 3. The player account may include the player's name and mailing address and other information of interest to the casino in connection with marketing efforts. The player account may also include the players psychographic profile indicating preferences of play and determining from a tracked history of play what outcomes motivate a player to keep playing. For instance, some players are motivated to keep playing by more frequent (but smaller) wins while others are motivated by the pursuit of a larger jackpot. This psychographic profile can be integrated within the invention to provide appropriate mystery bonuses to players at somewhat predictable times so that the player is properly motivated to keep playing. Prior to playing one of the gaming devices in the casino, the player inserts the player tracking card into the identification device 146 thus permitting the casino to track player activity, such as amounts wagered, credits won, and rate of play.

To induce the player to use the card and be an identified player, the casino may award each player points proportional to the money or credits wagered by the player. Players typically accrue points at a rate related to the amount wagered, although other factors may cause the casino to award the player various amounts. The points may be displayed on the secondary display 125 or using other methods. In conventional player tracking systems, the player may take his or her card to a special desk in the casino where a casino employee scans the card to determine how many accrued points are in the player's account. The player may redeem points for selected merchandise, meals in casino restaurants, or the like, which each have assigned point values. In some player tracking systems, the player may use the secondary display 125 to access their player tracking account, such as to check a total number of points, redeem points for various services, make changes to their account, or download promotional credits to the gaming device 110. In other embodiments, the identification device 146 may read other identifying cards (such as driver licenses, credit cards, etc.) to identify a player and match them to a corresponding player tracking account. Although FIG. 1A shows the player tracking unit 145 with a card reader as the identification device 146, other embodiments may include a player tracking unit 145 with a biometric scanner, PIN code acceptor, or other methods of identifying a player to pair the player with their player tracking account.

During typical play on a gaming device 110, a player plays a game by placing a wager and then initiating a gaming session. The player may initially insert monetary bills or previously printed tickets with a credit value into the bill acceptor 137. The player may also put coins into a coin acceptor (not shown) or a credit, debit or casino account card into a card reader/authorizer (not shown). In other embodiments, stored player points or special 'bonus points' awarded to the player or accumulated and/or stored in a player account may be able to be substituted at or transferred to the gaming device 10 for credits or other value. For example, a player may convert stored loyalty points to credits or transfer funds from his bank account, credit card, casino account or other source of funding. The selected source of funding may be selected by the player at time of transfer, determined by the casino at the time of transfer or occur automatically according to a predefined selection process. One of skill in the art will readily see that this invention is useful with all gambling devices, regardless of the manner in which wager value-input is accomplished.

The credit meter 127 displays the numeric credit value of the money inserted dependent on the denomination of the gaming device 110. That is, if the gaming device 110 is a nickel slot machine and a $20 bill inserted into the bill acceptor 137, the credit meter will reflect 400 credits or one credit for each nickel of the inserted twenty dollars. For gaming devices 110 that support multiple denominations, the credit meter 127 will reflect the amount of credits relative to the denomination selected. Thus, in the above example, if a penny denomination is selected after the $20 is inserted the credit meter will change from 400 credits to 2000 credits.

A wager may be placed by pushing one or more of the game buttons 132, which may be reflected on the bet meter 128. That is, the player can generally depress a "bet one" button (one of the buttons on the player interface panel 130, such as 132), which transfers one credit from the credit meter 127 to the bet meter 128. Each time the button 132 is depressed an additional single credit transfers to the bet meter 128 up to a maximum bet that can be placed on a single play of the electronic gaming device 110. The gaming session may be initiated by pulling the gaming handle 112 or depressing the spin button 133. On some gaming devices

110, a "max bet" button (another one of the buttons 132 on the player interface panel 130) may be depressed to wager the maximum number of credits supported by the gaming device 110 and initiate a gaming session.

If the gaming session does not result in any winning combination, the process of placing a wager may be repeated by the player. Alternatively, the player may cash out any remaining credits on the credit meter 127 by depressing the "cash-out" button (another button 132 on the player interface panel 130), which causes the credits on the credit meter 127 to be paid out in the form of a ticket through the ticket printer 138, or may be paid out in the form of returning coins from a coin hopper (not shown) to a coin return tray.

If instead a winning combination (win) appears on the display 120, the award corresponding to the winning combination is immediately applied to the credit meter 127. For example, if the gaming device 110 is a slot machine, a winning combination of symbols 123 may land on a played payline on reels 122. If any bonus games are initiated, the gaming device 110 may enter into a bonus mode or simply award the player with a bonus amount of credits that are applied to the credit meter 127.

Figure 2A:
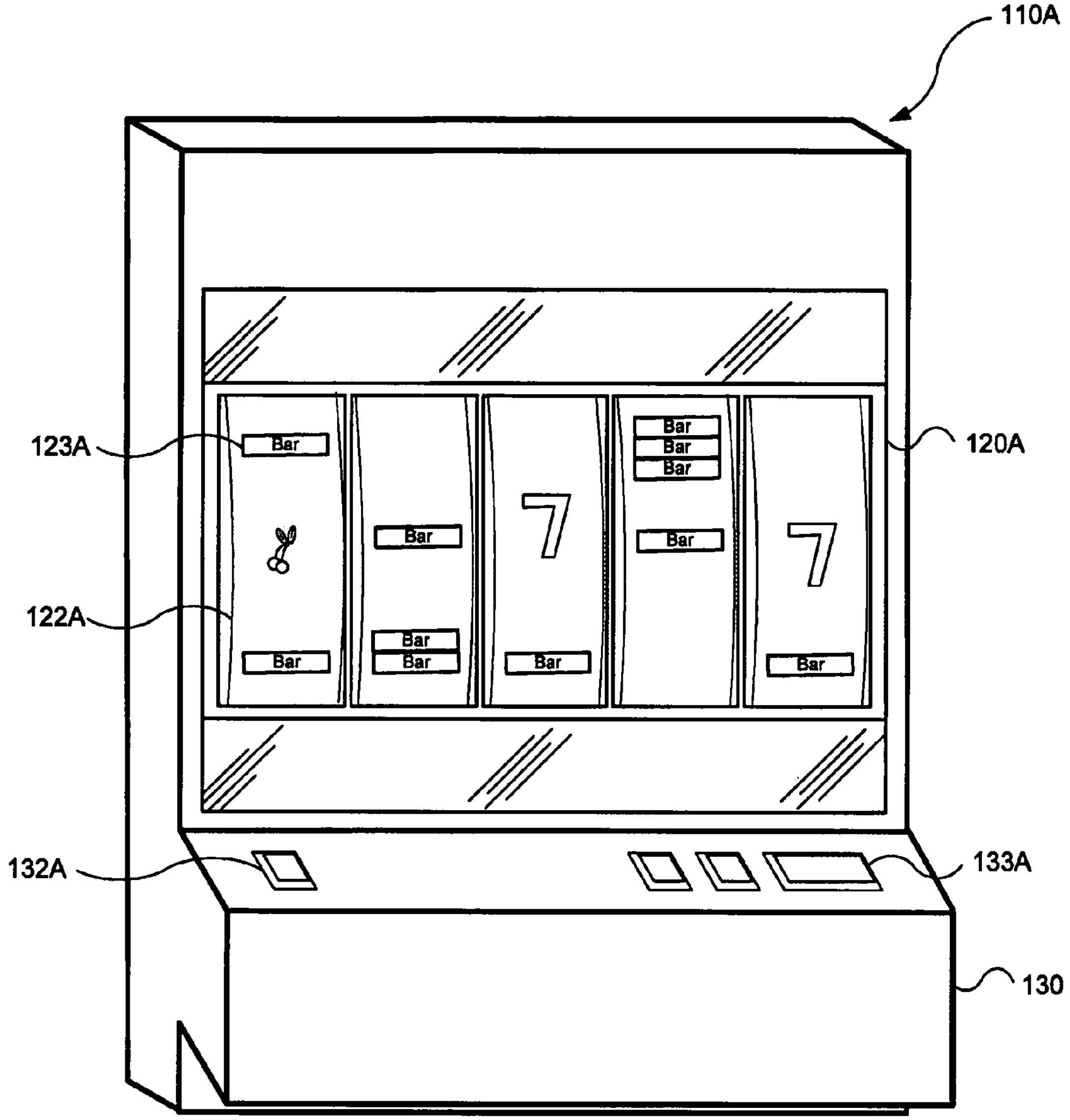
FIGS. 2A, 2B, and 2C are detail diagrams of exemplary types of gaming devices according to embodiments of the invention.
Figure 2B:
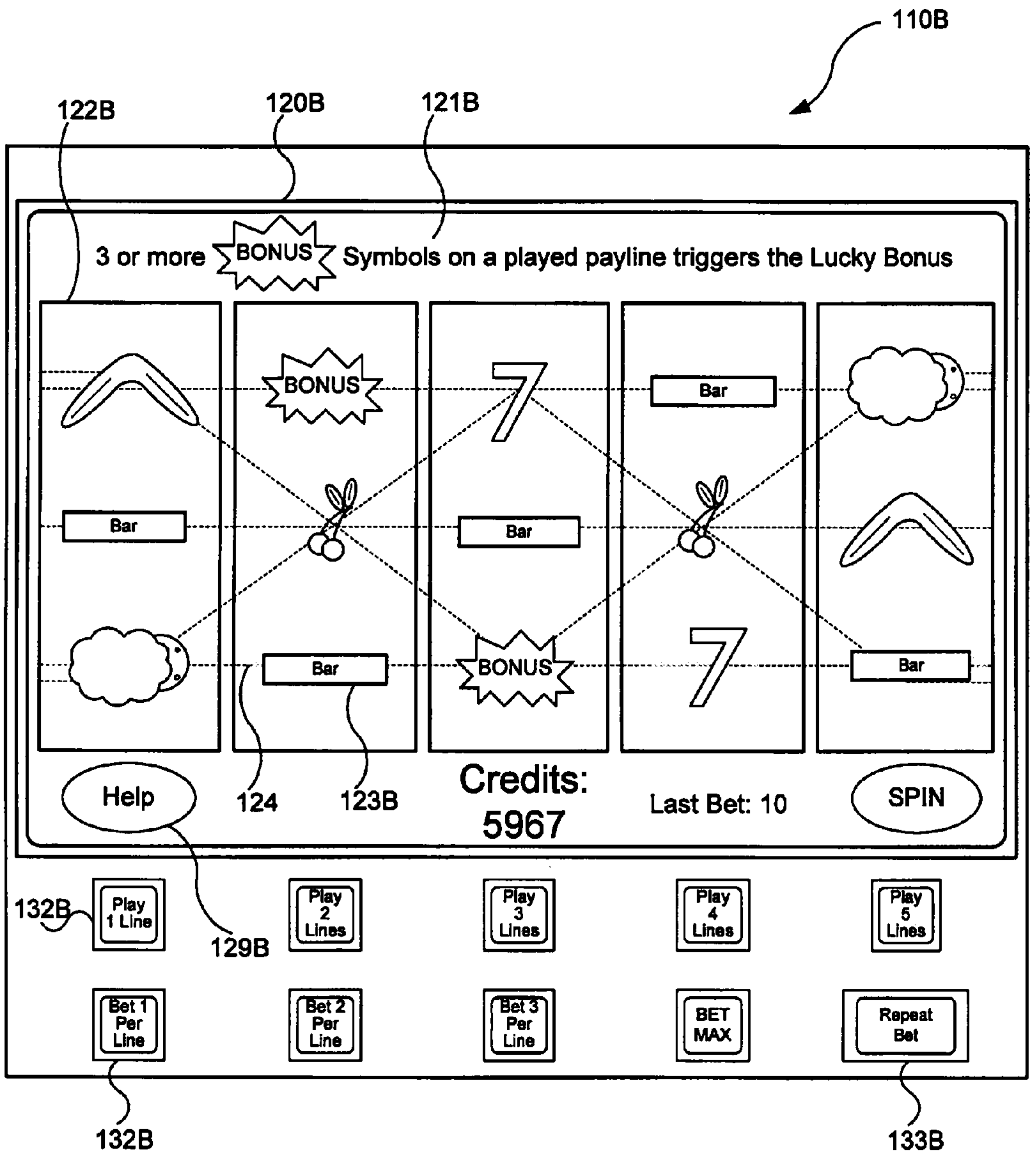
Figure 2C:
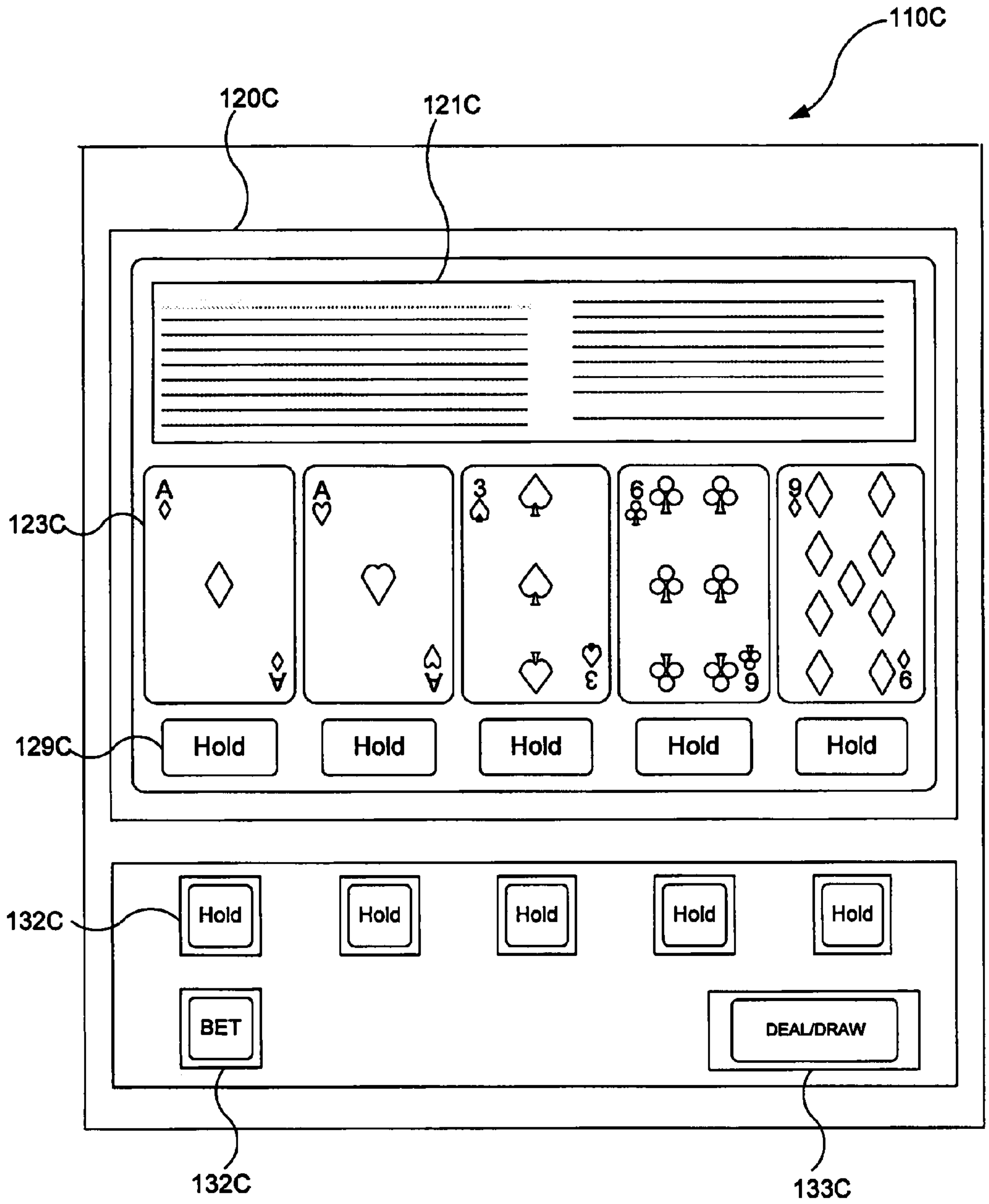

FIGS. 2A to 2C illustrate exemplary types of gaming devices according to embodiments of the invention. FIG. 2A illustrates an example spinning-reel gaming machine 110A, FIG. 2B illustrates an example video slot machine 110B, and FIG. 2C illustrates an example video poker machine 110C.

Referring to FIG. 2A, a spinning-reel gaming machine 110A includes a gaming display 120A having a plurality of mechanical spinning reels 122A. Typically, spinning-reel gaming machines 110A have three to five spinning reels 122A at specified base game indicia locations. Each of the spinning reels 122A has multiple symbols 123A that may be separated by blank areas on the spinning reels 122A, although the presence of blank areas typically depends on the number of reels 122A present in the gaming device 110A and the number of different symbols 123A that may appear on the spinning reels 122A. Each of the symbols 122A or blank areas makes up a "stop" on the spinning reel 122A where the reel 122A comes to rest after a spin. Although the spinning reels 122A of various games 110A may have various numbers of stops, many conventional spinning-reel gaming devices 110A have reels 122A with twenty-two stops.

During game play, the spinning reels 122A may be controlled by stepper motors (not shown) under the direction of the microprocessor 140 (FIG. 1A). Thus, although the spinning-reel gaming device 110A has mechanical based spinning reels 122A, the movement of the reels themselves is electronically controlled to spin and stop. This electronic control is advantageous because it allows a virtual reel strip to be stored in the memory 141 of the gaming device 110A, to where various "virtual stops" are mapped to each physical stop on the physical reel 122A. This mapping allows the gaming device 110A to establish greater awards and bonuses available to the player because of the increased number of possible combinations afforded by the virtual reel strips.

A gaming session on a spinning reel slot machine 110A typically includes the player pressing the "bet-one" button (one of the game buttons 132A) to wager a desired number of credits followed by pulling the gaming handle 112 (FIGS. 1A, 1B) or pressing the spin button 133A to spin the reels 122A. Alternatively, the player may simply press the "max-bet" button (another one of the game buttons 132A) to both wager the maximum number of credits permitted and initiate the spinning of the reels 122A. The spinning reels 122A may all stop at the same time or may individually stop one after another (typically from left to right) to build player anticipation. Because the display 120A usually cannot be physically modified, some spinning reel slot machines 110A include an electronic display screen in the top box 118 (FIG. 1B), a mechanical bonus mechanism in the top box 118, or a secondary display 125 (FIG. 1A) to execute a bonus.

Referring to FIG. 2B, a video gaming machine 110B may include a video display 120B to display virtual spinning reels 122B and various other gaming information 121B. The video display 120B may be a CRT, LCD, plasma screen, or the like. It is usually preferable that the video display 120B be a touchscreen to accept player input. A number of symbols 123A appear on each of the virtual spinning reels 122B. Although FIG. 2B shows five virtual spinning reels 122B at specified base game indicia locations, the flexibility of the video display 120B allows for various reel 122B and game configurations. For example, some video slot games 110B spin reels for each individual symbol position (or stop) that appears on the video display 120B. That is, each symbol position on the screen is independent of every other position during the gaming sessions. In these types of games, very large numbers of pay lines or multiple super scatter pays can be utilized since similar symbols could appear at every symbol position on the video display 120B. On the other hand, other video slot games 110B more closely resemble the mechanical spinning reel games where symbols that are vertically adjacent to each other are part of the same continuous virtual spinning reel 122B.

Because the virtual spinning reels 122B, by virtue of being computer implemented, can have almost any number of stops on a reel strip, it is much easier to have a greater variety of displayed outcomes as compared to spinning-reel slot machines 110A (FIG. 2A) that have a fixed number of physical stops on each spinning reel 122A.

With the possible increases in reel 122B numbers and configurations over the mechanical gaming device 110A, video gaming devices 110B often have multiple paylines 124 that may be played. By having more paylines 124 available to play, the player may be more likely to have a winning combination when the reels 122B stop and the gaming session ends. However, since the player typically must wager at least a minimum number of credits to enable each payline 124 to be eligible for winning, the overall odds of winning are not much different, if at all, than if the player is wagering only on a single payline. For example, in a five line game, the player may bet one credit per payline 124 and be eligible for winning symbol combinations that appear on any of the five played paylines 124. This gives a total of five credits wagered and five possible winning paylines 124. If, on the other hand, the player only wagers one credit on one payline 124, but plays five gaming sessions, the odds of winning would be identical as above: five credits wagered and five possible winning paylines 124.

Because the video display 120B can easily modify the image output by the video display 120B, bonuses, such as second screen bonuses are relatively easy to award on the video slot game 110B. That is, if a bonus is triggered during game play, the video display 120B may simply store the resulting screen shot in memory and display a bonus sequence on the video display 120B. After the bonus sequence is completed, the video display 120B may then retrieve the previous screen shot and information from memory, and re-display that image.

Also, as mentioned above, the video display 120B may allow various other game information 121B to be displayed. For example, as shown in FIG. 2B, banner information may be displayed above the spinning reels 122B to inform the player, perhaps, which symbol combination is needed to trigger a bonus. Also, instead of providing a separate credit meter 127 (FIG. 1A) and bet meter 128, the same information can instead be displayed on the video display 120B. In addition, "soft buttons" 129B such as a "spin" button or "help/see pays" button may be built using the touch screen video display 120B. Such customization and ease of changing the image shown on the display 120B adds to the flexibility of the game 110B.

Even with the improved flexibility afforded by the video display 120B, several physical buttons 132B and 133B are usually provided on video slot machines 110B. These buttons may include game buttons 132B that allow a player to choose the number of paylines 124 he or she would like to play and the number of credits wagered on each payline 124. In addition, a max bet button (one of the game buttons 132B) allows a player to place a maximum credit wager on the maximum number of available paylines 124 and initiate a gaming session. A repeat bet or spin button 133B may also be used to initiate each gaming session when the max bet button is not used.

Referring to FIG. 2C, a video poker gaming device 110C may include a video display 120C that is physically similar to the video display 120B shown in FIG. 2B. The video display 120C may present a poker hand of five cards 123C and various other player information 121C including a number of player selectable soft (touch-screen) buttons 129C and a paytable for various winning hands. Although the embodiment illustrated in FIG. 3C shows only one hand of poker on the video display 120C, various other video poker machines 110C may show several poker hands (multi-hand poker). Typically, video poker machines 110C play "draw" poker in which a player is dealt a hand of five cards that are displayed at specified base game indicia locations, has the opportunity to hold any combination of those five cards, and then draws new cards to replace the discarded ones. All pays are usually given for winning combinations resulting from the final hand, although some video poker games 110C may give bonus credits for certain combinations received on the first hand before the draw. In the example shown in FIG. 2C a player has been dealt two aces, a three, a six, and a nine. The video poker game 110C may provide a bonus or payout for the player having been dealt the pair of aces, even before the player decides what to discard in the draw. Since pairs, three of a kind, etc. are typically needed for wins, a player would likely hold the two aces that have been dealt and draw three cards to replace the three, six, and nine in the hope of receiving additional aces or other cards leading to a winning combination with a higher award amount. After the draw and revealing of the final hand, the video poker game 110C typically awards any credits won to the credit meter.

The player selectable soft buttons 129C appearing on the screen respectively correspond to each card on the video display 120C. These soft buttons 129C allow players to select specific cards on the video display 120C such that the card corresponding to the selected soft button is "held" before the draw. Typically, video poker machines 110C also include physical game buttons 132C that correspond to the cards in the hand and may be selected to hold a corresponding card. A deal/draw button 133C may also be included to initiate a gaming session after credits have been wagered (with a bet button 132C, for example) and to draw any cards not held after the first hand is displayed.

Although examples of a spinning reel slot machine 110A, a video slot machine 110B, and a video poker machine 110C have been illustrated in FIGS. 2A-2C, gaming machines and various other types of gaming devices known in the art are contemplated and are within the scope of the invention.

Figure 3:
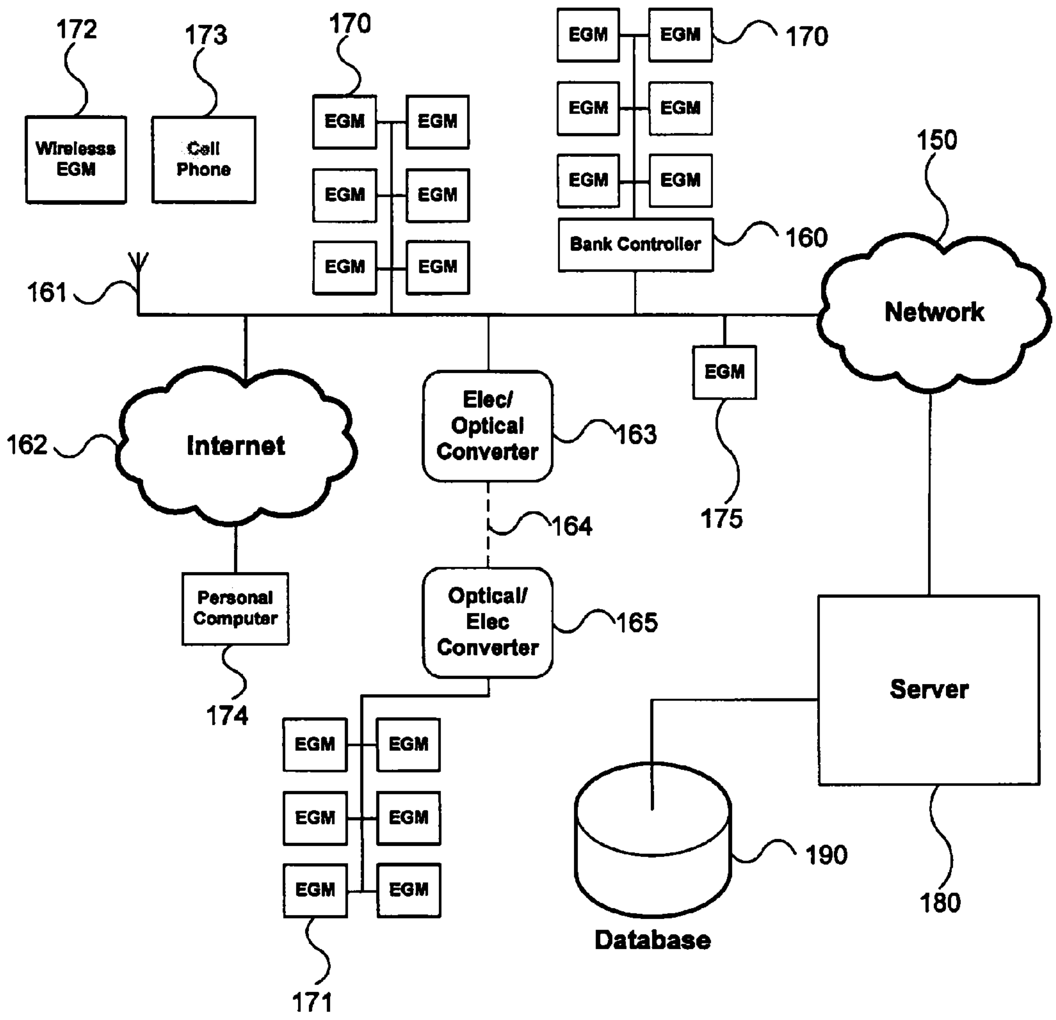
FIG. 3 is a functional block diagram of networked gaming devices according to embodiments of the invention.

FIG. 3 is a block diagram illustrating networked gaming devices according to embodiments of the invention. Referring to FIG. 3, multiple electronic gaming devices (EGMs) 170, 171, 172, 173, 174, and 175 may be coupled to one another and coupled to a remote server 180 through a network 150. For ease of understanding, gaming devices or EGMs 170, 171, 172, 173, 174, and 175 are generically referred to as EGMs 170-175. The term EGMs 170-175, however, may refer to any combination of one or more of EGMs 170, 171, 172, 173, 174, and 175. Additionally, the gaming server 180 may be coupled to one or more gaming databases 190. These gaming network 150 connections may allow multiple gaming devices 170-175 to remain in communication with one another during particular gaming modes such as tournament play or remote head-to-head play. Although some of the gaming devices 170-175 coupled on the gaming network 150 may resemble the gaming devices 110, 110A, 110B, and 110C shown in FIGS. 1A-1B and 2A-2C, other coupled gaming devices 170-175 may include differently configured gaming devices. For example, the gaming devices 170-175 may include traditional slot machines 175 directly coupled to the network 150, banks of gaming devices 170 coupled to the network 150, banks of gaming devices 170 coupled to the network through a bank controller 160, wireless handheld gaming machines 172 and cell phones 173 coupled to the gaming network 150 through one or more wireless routers or antennas 161, personal computers 174 coupled to the network 150 through the internet 162, and banks of gaming devices 171 coupled to the network through one or more optical connection lines 164. Additionally, some of the traditional gaming devices 170, 171, and 175 may include electronic gaming tables, multi-station gaming devices, or electronic components operating in conjunction with non-gaming components, such as automatic card readers, chip readers, and chip counters, for example.

Gaming devices 171 coupled over an optical line 164 may be remote gaming devices in a different location or casino. The optical line 164 may be coupled to the gaming network 150 through an electronic to optical signal converter 163 and may be coupled to the gaming devices 171 through an optical to electronic signal converter 165. The banks of gaming devices 170 coupled to the network 150 may be coupled through a bank controller 160 for compatibility purposes, for local organization and control, or for signal buffering purposes. The network 150 may include serial or parallel signal transmission lines and carry data in accordance with data transfer protocols such as Ethernet transmission lines, RS-232 lines, firewire lines, USB lines, or other communication protocols. Although not shown in FIG. 3, substantially the entire network 150 may be made of fiber optic lines or may be a wireless network utilizing a wireless protocol such as IEEE 802.11a, b, g, or n, Zigbee, RF protocols, optical transmission, near-field transmission, or the like.

As mentioned above, each gaming device 170-175 may have an individual processor 140 (FIG. 1A) and memory 141 to run and control game play on the gaming device 170-175, or some of the gaming devices 170-175 may be terminals that are run by a remote server 180 in a server based gaming environment. Server based gaming environments may be advantageous to casinos by allowing fast downloading of particular game types or themes based on casino preference or player selection. Additionally, tournament based games, linked games, and certain game types, such as BINGO or keno may benefit from at least some server 180 based control.

Thus, in some embodiments, the network 150, server 180, and database 190 may be dedicated to communications regarding specific game or tournament play. In other embodiments, however, the network 150, server 180, and database 190 may be part of a player tracking network. For player tracking capabilities, when a player inserts a player tracking card in the card reader 146 (FIG. 1A), the player tracking unit 145 sends player identification information obtained on the card reader 146 through the MCI 142 over the network 150 to the player tracking server 180, where the player identification information is compared to player information records in the player database 190 to provide the player with information regarding their player account or other features at the gaming device 110 where the player is wagering. Additionally, multiple databases 190 and/or servers 180 may be present and coupled to one or more networks 150 to provide a variety of gaming services, such as both game/tournament data and player tracking data.

The various systems described with reference to FIGS. 1-3 can be used in a number of ways. For instance, the systems can be used to track data about various players. The tracked data can be used by the casino to provide additional benefits to players, such as extra bonuses or extra benefits such as bonus games and other benefits as described above. These added benefits further entice the players to play at the casino that provides the benefits.

Figure 4:
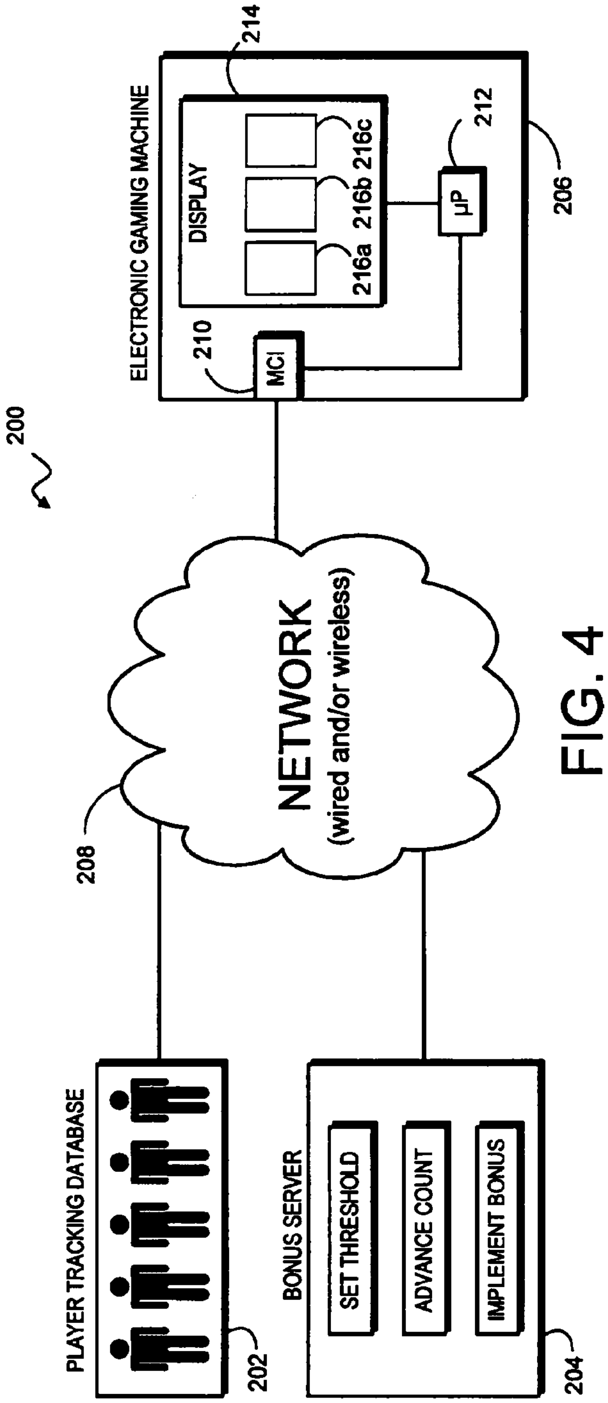
FIG. 4 is a schematic diagram illustrating a system configured to implement the invention.

FIG. 4 illustrates is a simplified schematic representation of a gaming network 200 configured to implement features of the invention. The system general includes a player tracking database 202, a bonus server 204, gaming machines 206, and accounting systems (not shown) coupled to a network 208 for communication therebetween.

Player tracking database 202 interfaces with a player input device such as an identification card reader 145 (FIG. 1) on gaming machine 206 and can operate as described above to identify a player, track player wagers and winnings, and maintain biographical and/or psychographic information about the player. The player's psychographic profile, as described above, can include information indicating the player's preferences of play and determining from a tracked history of play what outcomes motivate a player to keep playing. For instance, some players are motivated to keep playing by more frequent (but smaller) wins while others are motivated by the pursuit of a larger jackpot. This psychographic profile can be integrated within the invention to provide appropriate mystery bonuses to players at somewhat predictable times so that the player is properly motivated to keep playing as noted below.

Bonus server 204 is configured to set a threshold, advance a count, and implement a bonus on gaming machine 206 once the threshold is met as described below. Instructions for operating the gaming machine 206 can be communicated through the network 208 to the gaming machine's machine control interface (MCI) 210, that then operates the gaming machine to implement the bonus. Although bonuses on networked gaming machines can be controlled remotely through a networked device such as a bonus server 204, it is understood that the gaming machine can be operated alone to set a bonus threshold, advance a count according to play on the machine, and implement the bonus. The invention is not intended to be limited to the embodiment shown specifically in FIG. 4, but is only one of many contemplated within the spirit of the invention.

Electronic gaming machine 206 includes an MCI 210 that operates to control a microprocessor 212, which itself implements programming adapted to control the appearance of gaming indicia on a display 214 at distinct gaming indicia locations. In the embodiment shown, display 214 includes three gaming indicia locations 216*a*, 216*b*, 216*c* representative of three slots. It is understood that the number and placement of the locations are not so limited, and can be four as shown in the slot machine of FIG. 1A, five as shown in the gaming machines of FIGS. 2A, 2B, and 2C, or any other number appropriate to the base game being played. For instance, if the game of single-hand poker is to be played on gaming machine 206, the base game indicia locations on the display is set to five.

Operation of the gaming machine according to preferred embodiments involves playing the base game (e.g. slots) which tracking a player's advance toward a threshold. Once the threshold is reached, the gaming machine enters a bonus operation where symbols or indicia are displayed in the indicia locations 216*a*, 216*b*, 216*c* in place of a base game operation. By way of example, and as discussed in more detail further below, a bonus trigger event could result in a 7-7-7 on the three slot locations, an event which may or may not be possible on the base game.

Other embodiments are contemplated in which outcomes are at least partially determined by mystery bonus.

A first such embodiment is as described above in which winning results on a base game can comprise a combination of random number generated winning outcomes and triggered mystery bonus outcomes where, preferably, a triggered mystery bonus result is displayed on the gaming machine in place of a randomized base game result. The mystery bonuses may be tracked and triggered through a bonus server 204 as shown in FIG. 4. Additionally, the random number generated outcome on the gaming machine 206 may be determined internally or externally of the gaming machine. When determined externally, the gaming machine 206 would simply act as a display device to display a result determined externally of the machine but otherwise not act to determine a result.

In a second embodiment, winning results can again be a combination of random number generated winning outcomes and triggered mystery bonus outcomes. The mystery bonus, however, may be tracked and triggered within gaming machine 206 itself so that there is no need for external equipment such as MCI 210, network 208, or bonus server 204. Each mystery jackpot can be calculated by the gaming machine based upon wagers made, games played, or a combination thereof. The exact calculation (including jackpot size, trigger threshold ranges, the thresholds themselves, etc.) may be calculated identically for all players, may vary according to the player profile or other factors such as time of day, busyness of the casino, etc.

In a third embodiment, there are no random number generated winning outcomes—and instead all winning outcomes are the result of triggered mystery bonus events. That is, all winning results on the base game are triggered by a mystery bonus so that there are in fact no random number generated outcomes—the RNG only determining the threshold at which the award occurs within the jackpot range.

In the third embodiment, the mystery bonuses are tracked externally of the gaming machine 206.

In a fourth embodiment, the mystery bonus is tracked internally of the gaming machine so that there is no need for external equipment such as MCI 210, network 208, or bonus server 204.

In a fifth embodiment, the mystery bonus is tracked externally as via bonus server 204. Play on more than one gaming machine may advance a count common to players on multiple gaming machines so that the player that created the event that triggered the mystery bonus would be granted the award. For example, a mystery jackpot controls the striking of a BAR-BAR-BAR winning outcome. But all play on all connected games may increment the mystery counter. Whichever player causes the threshold to be met wins the prize, and the players may or may not be aware of the competition.

In a sixth embodiment, the mystery jackpot for a particular outcome is grouped by player profile or other category. As one example, all play from players of type A feed into one mystery pool while all play from players of type B feed another mystery pool.

Various permutations of the invention and of the system of FIG. 4 are contemplated as shown in Table 1 below where selection is taken from each of columns A, B, and C.

TABLE 1

Base Game/Mystery Bonus Combinations

| A RNG Award Mechanism | B Mystery Award Mechanism | C Count Advance |
|---|---|---|
| Internal | Internal | Single Player |
| External | External | Multiple (e.g. bank) machines |
| Internal and External | Internal and External | Multiple (e.g. type) Players |
| No RNG Award | | |

The term "internal" means that the mechanism (whether for RNG awards or mystery awards) is within the gaming machine itself. In some hybrids of the invention, e.g. where the mechanisms are located both internally and externally, some RNG/mystery outcomes may be determined by the base game while others are determined by system elements. Variations of the above embodiments are contemplated without varying from the spirit of the invention.

Figure 5:
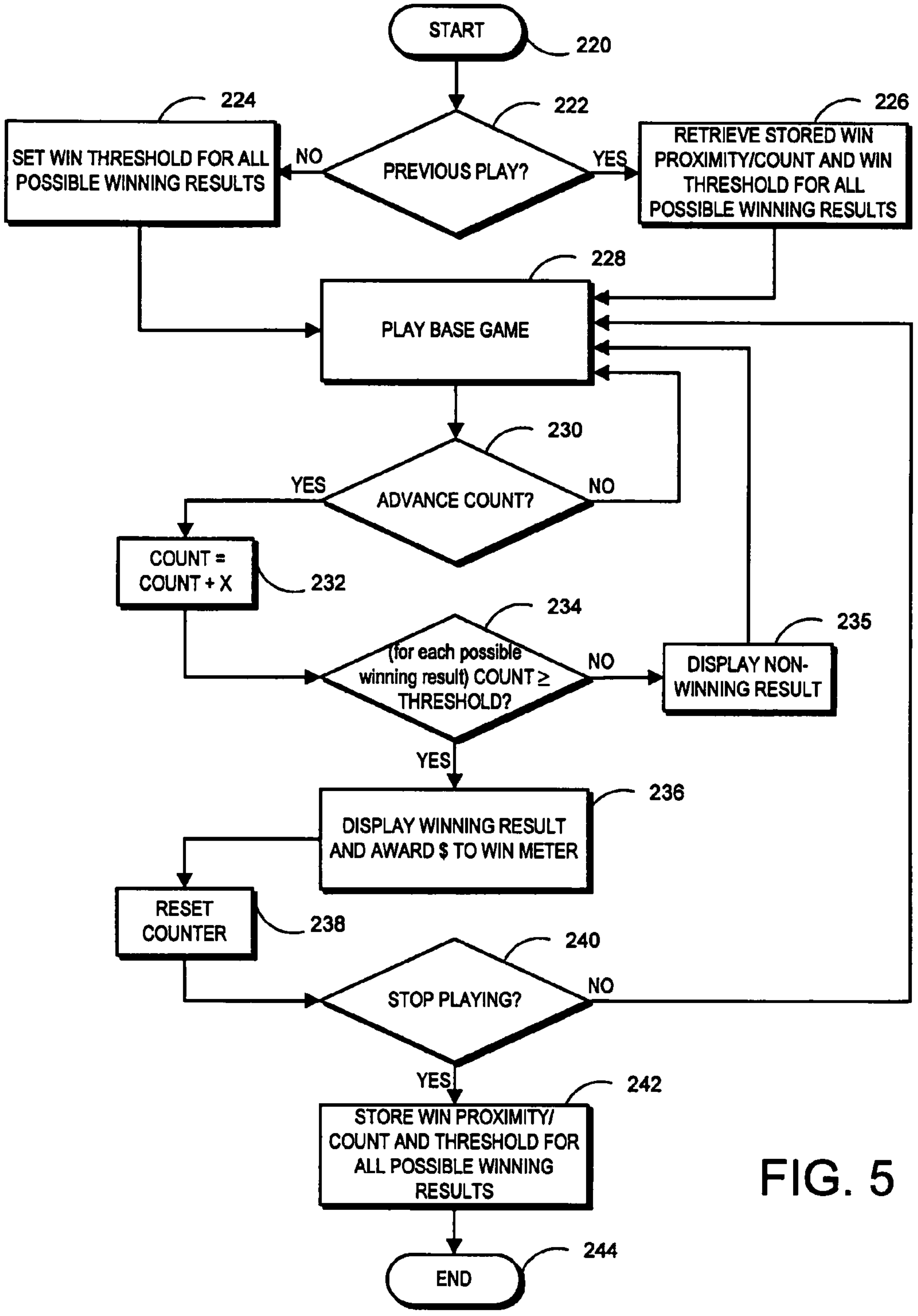
FIGS. 5-7 are flow diagrams illustrating processes for determining results on the gaming machine according to various implementations of the invention.

FIG. 5 illustrates an operation of the invention. Play starts at block 220 when a player inserts his or her player card into a machine or commences play at a machine without the player card. The process enters query block 222 in which a player record is consulted to determine whether a record exists and whether the player has played previously. Alternately or additionally, query block 222 determines whether play (even by another player) on the gaming machine had previously taken place and sets the win thresholds and tracked count(s) accordingly.

If there is no record of previous play, then the process proceeds to block 224 in which win thresholds for all bonus results are set. As a simple example, two bonus results might be BAR-BAR-BAR and 7-7-7 with base probabilities of occurrence for each set at 1:40 and 1:10,000. That is, BAR-BAR-BAR has a default probability of occurrence of once every forty plays, which 7-7-7 has a default probability of occurrence of once every ten-thousand plays. The occurrence of the bonus may be varied by interposing a randomized number (e.g. random number between 1 and 80 for the BAR-BAR-BAR result) into the probability so that, on average the bonus occurs every 40 plays, but that the result could occur on the $1^{st}$ play, the $80^{th}$ play, or any play in between. Once a win occurs, the next threshold is determined. Alternately, thresholds can be mapped out for multiple awards so that it is known in advance by the gaming system that a player will achieve a BAR-BAR-BAR result on the $6^{th}$ play, the $60^{th}$ play, the $98^{th}$ play, the $110^{th}$ play, the $111^{th}$ play and the $190^{th}$ play. In the context of the invention, a "play" is associated with a "count" that is tracked according to methods described below.

In an alternative aspect of the invention, the player psychographic profile can be consulted to best alter the probabilities to motivate the player to keep playing. For instance, a player whose record (or personal choice) indicates that he or she desires more frequent wins may have the base BAR-BAR-BAR probability of occurrence set to 1:30 rather than 1:40; to balance the odds back in the house's favor, the 7-7-7 result probability of occurrence would be set to 1:20,000 rather than 1:10,000. In contrast, a player exhibiting a preference for larger wins may result in the odds of obtaining a 7-7-7 result in the bonus game to 1:4000, with a resultant decrease in the odds of obtaining the smaller bonus awards. In another variation, the player could choose which probabilities to use right on the game screen so that the player is given more custom control over his or her win probabilities and types within predefined payback percentages or budgets.

If in query block 222 it is determined that a player record does indicate previous play, then account information is retrieved in block 226 for the current tracked count information and win threshold for all possible bonus results. The player may then play at one machine to accumulate a count, leave the machine, come back later to that or a similar machine, and maintain their count and proximity to various awards.

Alternate embodiments are contemplated for setting proximity, thresholds, and counts for achieving certain game results. One option is that no player history is taken into account—that is, each new play session starts from a predefined initial point. Another option is that the game is left in the state a player leaves it in. In other words, if player A gets very close to winning an award but does not, the next player to play the game begins from that very close position. Yet another option is that any accumulated play progress expires or diminishes if a defined elapsed time passes. Finally, progress on some awards could be allowed to carry over from only play session to another while others reset or are passed off to the next player. For example, a player could keep his progress on the top two awards but all other progress is passed on to the subsequent payer.

A player plays the base game 228 and a determination is made in query block 230 whether the player's count is to be advanced. In one aspect of the invention, the count is advanced when only a MAX bet is played. For instance, if the first two credits played fund the base game and the third credit in funds the bonus game, then only the third credit in advances the count toward winning any of the bonus awards. In other contemplated aspects, the count is advanced for each credit played, at random, for designated players, during designated times, only during promotional events, or any combination thereof. If the count is not to be advanced, the play proceeds back to block 228 where the base game is played again.

If the count is to be advanced, the play proceeds to block 232 where the new count value is equal to the old count value plus some amount. If the count is advanced by a MAX bet, then the count advances one. If the count is advanced by each credit played, then the 'x' amount added to the count is the number of credits played.

Play proceeds to query block 234 in which the updated count number is compared to the threshold determined for each bonus award. If the count does not meet the threshold for any bonus award, the play returns back to block 228 in which play of the primary game proceeds. This return may also include display of a non-winning result on the base game as in block 235. If, on the other hand, the count meets one or more bonus award thresholds, then a bonus result is activated on the gaming machine in block 236 by displaying a winning result on the display and awarding an appropriate number of credits to the win meter of the gaming machine or player account. As will be appreciated from a discussion of FIG. 7, the bonus result may be immediately activated to appear on the base game display or delayed depending upon the result of the next base game result.

Once a bonus award is won, the threshold counter for that award may be reset in block 238. For instance, a single cherry result may occur on average every five times the base game is played—or between every 1 and 10 plays according to a random number generator. If a random determination causes the single cherry result to occur on the $3^{rd}$ play of the base game, then payment of the award causes a recalculation of the trigger event (example: the $9^{th}$ play after payment), and so on. In this way, win proximity to that particular bonus award zeroes out after a win and advances toward the threshold set. Alternately, the counter need not be reset in block 238, but rather the thresholds are cumulative. So instead of the threshold being set after each win, the threshold is alternately set progressively so that it occurs when the count reaches 3, 11, etc.

Although the invention might most often be used to trigger the award of winning results, it is also contemplated that some or all non-winning results could also be triggered using count and threshold triggering. For instance, a bonus game award mechanism such as bonus server 204 (FIG. 4) can be further configured to determine a threshold tied to a non-winning result, track play of the base game, advance a counter associated with the non-winning result responsive to play at the base game, and cause display of the non-winning result at the base game display in place of the base game result when the counter associated with the non-winning result bears a predefined relationship with the threshold tied to the non-winning result.

The term bonus award/result can potentially include game results that do not result in a payout to the player, but also include special non-winning outcomes. Some losing outcomes have more impact to players than others. For example, a 7-7-space, in which the $3^{rd}$ '7' is one spot above or below the pay line is more exciting than a space-space-space result, in which three blanks are displayed. The frequency in which each of these types of special losing outcomes is displayed could be determined using the same process as with determining winning bonus outcomes. Accordingly, the gaming device bonus game award mechanism can be further configured to display a plurality of indicia at indicia locations 216*a*, 216*b*, and 216*c* (FIG. 4) of the base game display that differ from a bonus result by only a single indicia.

Stopping play, as in query block 240, triggers the system to store in block 242 the updated counts and thresholds for the bonus awards in a database (e.g. remote player tracking database 202 or bonus server 204) and the process ends in block 244. The stored counts and thresholds may then later be retrieved and used by the player in block 226 in subsequent play of that or a similar gaming machine. If play continues, the process returns to play of the base game in block 228 and the process proceeds as described above.

Figure 6:
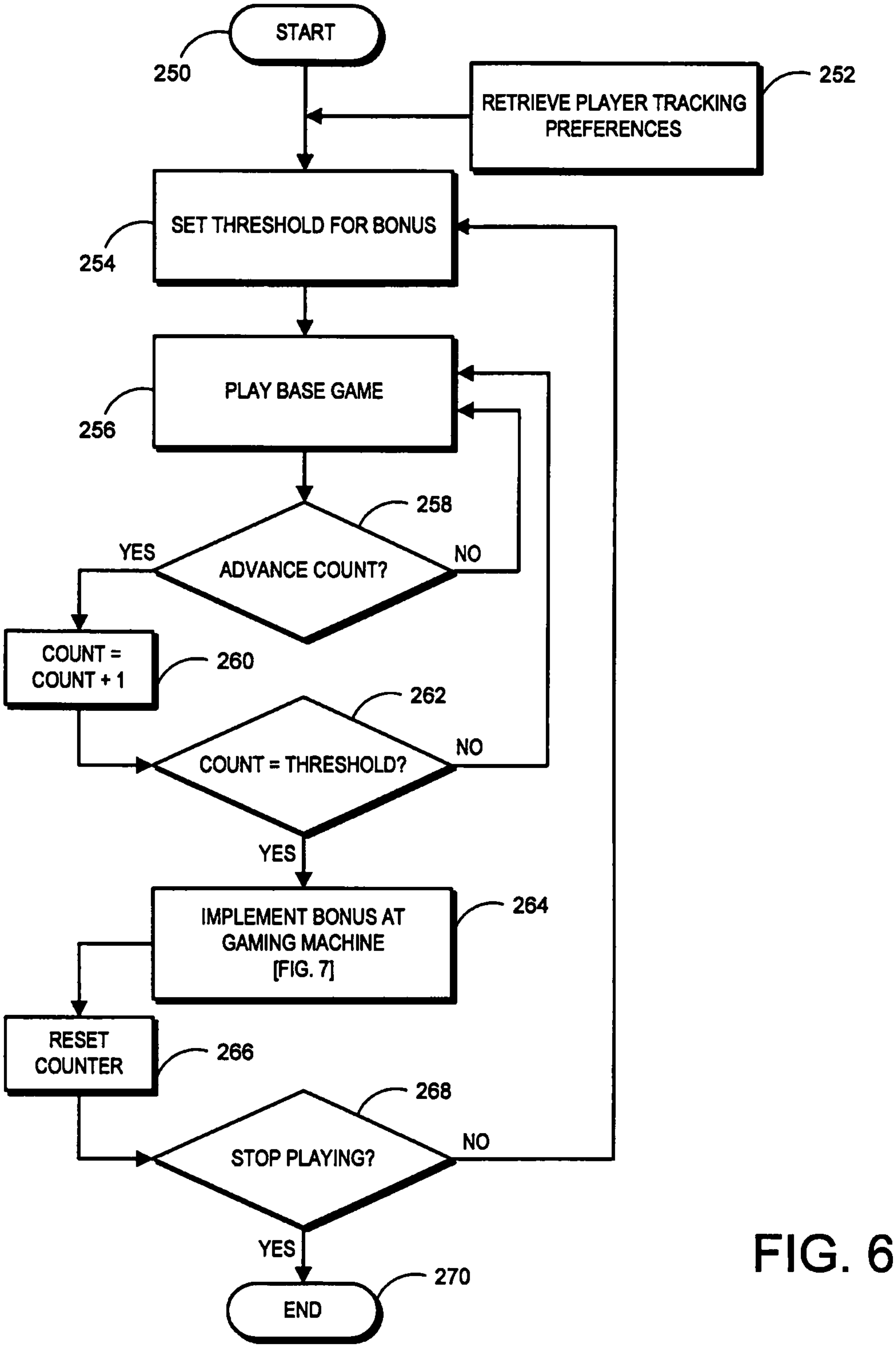

FIG. 6 illustrates another aspect of the method for implementing a bonus at the gaming machine. Two mutually exclusive elements may be incorporated: that of taking player preferences into account when setting thresholds for each of the bonus awards, and using the mystery bonus method to fully control all winning outcomes of the gaming machine.

Play commences at start block 250 when a player inserts his or her player card into the gaming machine or otherwise identifies themselves as by punching in identification codes and pin numbers into a keypad at the gaming machine, using a fingerprint ID system, etc. Thresholds for each of the bonus awards are set or retrieved in block 254 in light of player preferences expressed in the player record and retrieved in block 252. The base game is played in block 256—such as slots, poker, keno, or other game—and the count is advanced in query block 258 and block 260 as by methods expressed above. A count meeting a threshold for a bonus award (or base game award) in query block 262 causes the gaming machine to implement a 'win' in block 264. If the win is a bonus award, then play proceeds to FIG. 7 where the bonus award may be substituted in place of the base game result or, alternately, delayed if the base game is a winning result or one that meets a certain threshold. If, on the other hand, the bonus award method is operative to control all wins on the gaming machine, then the winning result is displayed on the gaming machine display; otherwise, a losing result is displayed.

Once a winning or bonus result tied to a count and threshold is obtained, play proceeds optionally to block 266 in which the counter is reset for the particular bonus award won. As before, the threshold numbers can be progressively determined so that the counter need not be reset.

Once play stops in query block 268, the process ends in block 270; otherwise, play returns to block 254 in which the threshold of the winning result is reset (or not).

Figure 7:
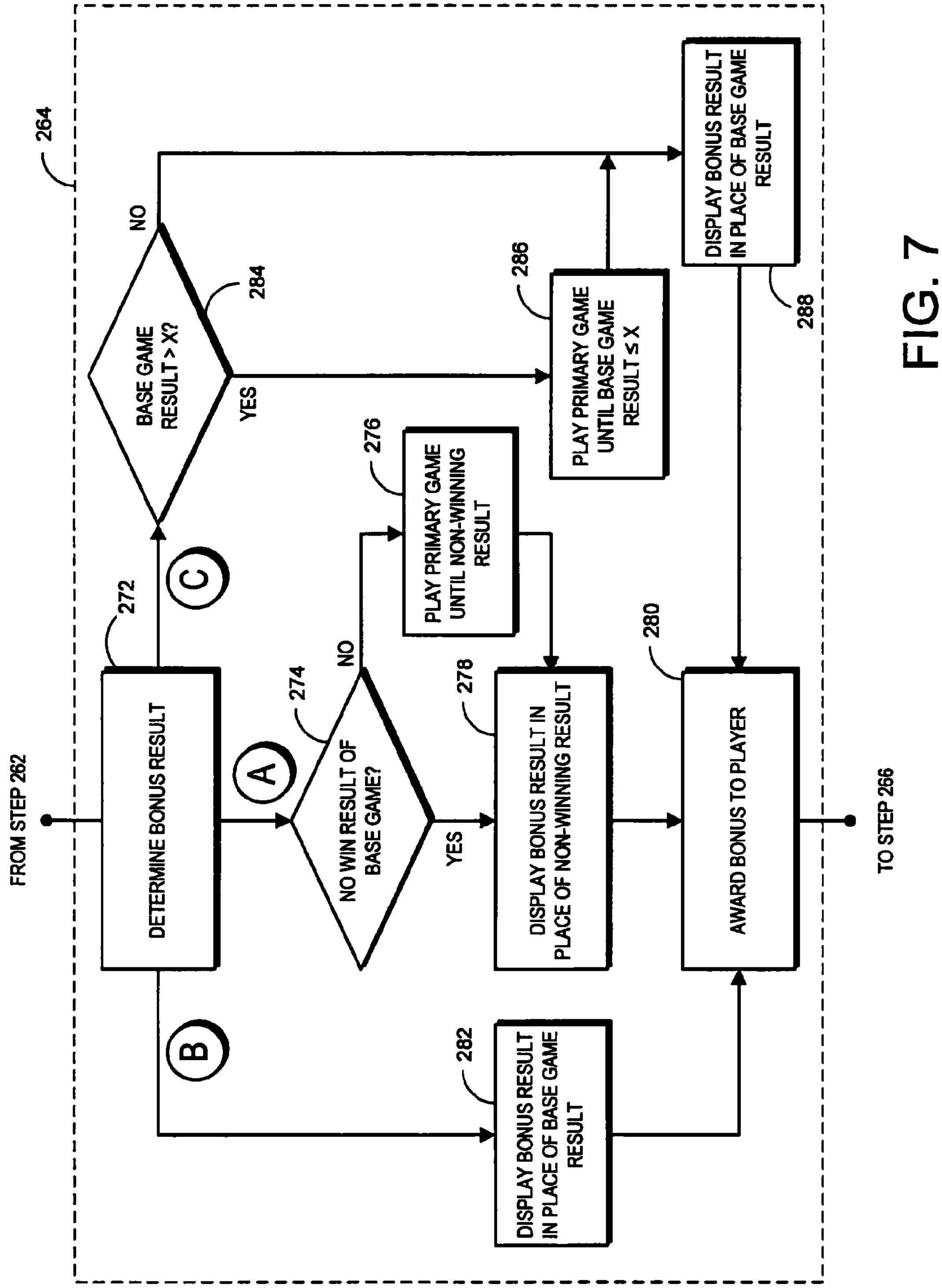

FIG. 7 illustrates an alternative aspect of the inventive method that expands the implemented bonus process block 264 of FIG. 6. If the count for a particular award or result meets the determined threshold in query block 262, then play proceeds to block 272 in which the bonus result (e.g. 7-7-7) is determined. Play then branches in one of three directions depending upon the particular implementation of the invention selected.

In branch A, query block 274 determines whether the base game result from the play causing the trigger event is a 'no win' event. If the base game result is a win, then play proceeds to block 276 in which display and award of the bonus result is delayed; that is, the winning base game result is displayed and awarded to the player and the bonus result is only displayed in place of a non-winning result in block 278. The bonus award is then awarded to the player in block 280.

In branch B, the bonus award is displayed in place of the base game result in block 282 regardless of the outcome of the base game. The bonus is then awarded to the player in block 280.

In branch C, query block 284 determines whether the base game result meets a certain threshold. In one aspect, the threshold is size of win of the base game result. In this way, the player would not lose out on a major jackpot simply because a threshold was crossed for the base game. If the base game result in query block 284 meets or exceeds a certain threshold, then play proceeds to block 286 in which the base game result is implemented on the gaming machine and the base game played until the base game (e.g. winning or non-winning) result does not meet a certain threshold. For a sufficiently negative base game result, the bonus result indicated by the threshold crossing is displayed in place of the base game result in block 288. Play the proceeds to block 280 in which the bonus award is awarded to the player. After award in block 280, play proceeds optionally to step 266 in which the counter associated with the won bonus award is reset.

An example of a branch C operation is with the following base game results: (1) non-win*, (2) non-win, (3) high win*, (4) low win, (5) non-win, (6) non-win, (7) low win* where * denotes a bonus award event. Play on the gaming machine results in seven (7) base game results and three (3) bonus results. If the filter of query block 284 is that only high win awards on the base game will supersede a bonus award, then the resulting play results are in the following order: (1) bonus, (2) non-win, (3) high win, (4) bonus, (5) non-win, (6) non-win, (7) bonus. One appreciates that under the process of branch C that the bonus awards take the place of spins (1), (4) and (7). Even though a bonus occurred in spin (3), the fact that the base game result was a high-win caused the base game result to be implemented and the bonus implemented in the next non-high-win result, e.g. the low-win result of spin (4). In contrast, branch B would result in the high-win being superseded, and branch A would result in a total of eight (8) spins since spin (7)—being a winning base game result—cannot be supplanted by a bonus win.

Figure 8:
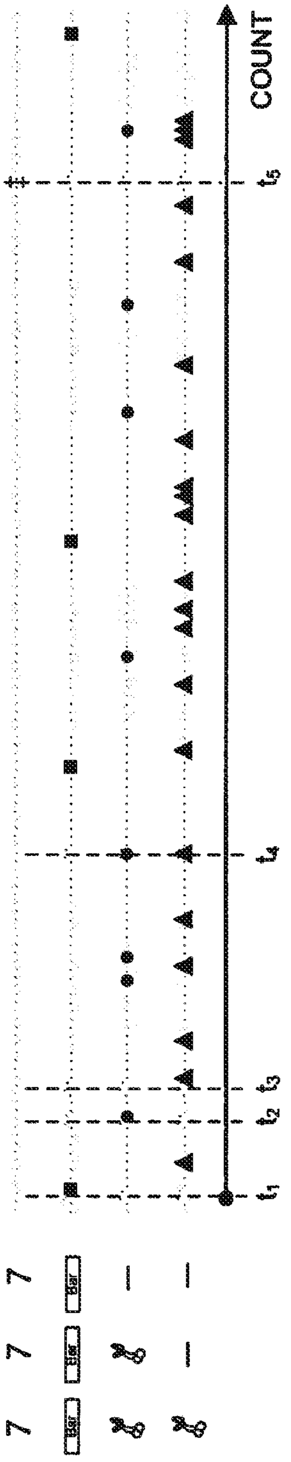
FIG. 8 is a graph illustrating the occurrence of various bonus results in relation to the advance of a counter as play on the gaming machine progresses.

FIG. 8 illustrates the occurrence of bonus events along a countline/timeline. Four different potential bonus results for a three-reel slot machine are illustrated as examples: (a) a single cherry result, (b) a two-cherry result, (c) a BAR-BAR-BAR result, and (d) a 7-7-7 result. Each bonus result is tied to a particular threshold, or potential range of thresholds. For instance, whereas a single cherry bonus result is intended to occur on average once every five plays, the actual occurrence of the single cherry bonus result could be determined by a random number generator (RNG) that chooses a trigger point between a range of numbers, say between 1 and 9. That is, to achieve an average occurrence of 1:5, the range within which the threshold is selected can be composed from many formulas, one being where the range is between 1 to 2N−1, where 1:N is the desired win ratio/probability (that is, where a win occurs approximately once every five plays). Hence, a 1:5 value is obtained by selecting a trigger amount from a range of 1 to 9. This trigger point corresponds with the threshold count at which the particular bonus result occurs. So if play commences with a cumulative count of 17, and the randomly determined trigger point for a single-cherry result is 6, then the single-cherry bonus result occurs at cumulative count 23 (=17+6) subject to the base game result as noted in FIG. 7.

The countline in FIG. 8 indicates five different points in time during play of a gaming machine by a player at which certain counts occur. The countline shown is cumulative in nature, although the count for each result can be reset after award. Thus, for instance, the threshold for a single-cherry event as determined by a random number generator between trigger points 1 and 9 can be as follows: 6, 7, 2, 6, 3, etc. In cumulative form, these are 6, 13, 15, 21, 24, etc.

Each of the different possible bonus award results is shown on different lines, and the occurrence of those awards along the countline are shown by various symbols: a triangle for a single-cherry bonus result, a circle for a double-cherry bonus result, a square for a BAR-BAR-BAR result, and a double-cross for a 7-7-7 result. At time $t_1$, for instance, the BAR-BAR-BAR bonus result is closest to being won and its win proximity would be reflected as illustrated in the win proximity meter described below with reference to FIGS. 11-16. Bonus result 7-7-7 is still a long way from being awarded so that its win proximity is relatively low. Bonus result single-cherry is next closest, and is actually awarded prior to time $t_2$. At time $t_2$, and after the single-cherry bonus event has occurred, the double-cherry bonus event is imminent. At time $t_3$, and after the double-cherry bonus result has occurred, the single-cherry bonus event is again imminent. Between time $t_3$ and time $t_4$, four more single-cherry bonus results have occurred and two more double-cherry events. No BAR-BAR-BAR bonus results and no 7-7-7 have yet occurred. At time $t_4$, the thresholds of two different bonus results coincide: that of a single-cherry bonus result and a double-cherry bonus result. The award process can be structured to display the best bonus event in place of the base game results, both bonus events consecutively, or any combination contemplated. Finally, at time $t_5$ and after many occurrences of the other possible bonus results, the threshold count for a 7-7-7 bonus result is achieved and implemented according to teachings of the invention.

One items of note in the illustration of FIG. 8 is the variable distance between adjacent bonus events. Some events are close in count or time as the two adjacent double-cherry results between time $t_3$ and $t_4$ or immediately adjacent occurrences of the single-cherry result. On the other hand, some occurrences may be far separated such as the occurrence between the $1^{st}$ and $2^{nd}$ occurrence of the BAR-BAR-BAR result when compared to the count trigger between the $2^{nd}$ and $3^{rd}$ occurrence. This variable count difference reflects the use of a random number generator to determine the next occurrence of a bonus result according to an established range and average odds rate.

FIGS. 9A through 9E illustrate win proximity at the times $t_1$ through $t_5$, respectively, noted in FIG. 8.

Figure 9A:
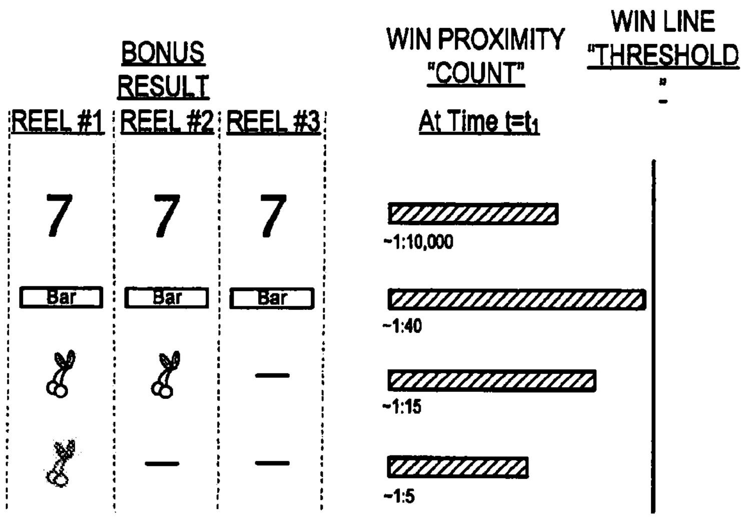
FIGS. 9A-9E illustrate win proximity of the various bonus results taken at five different counter slices as shown in FIG. 8.
Figure 10:
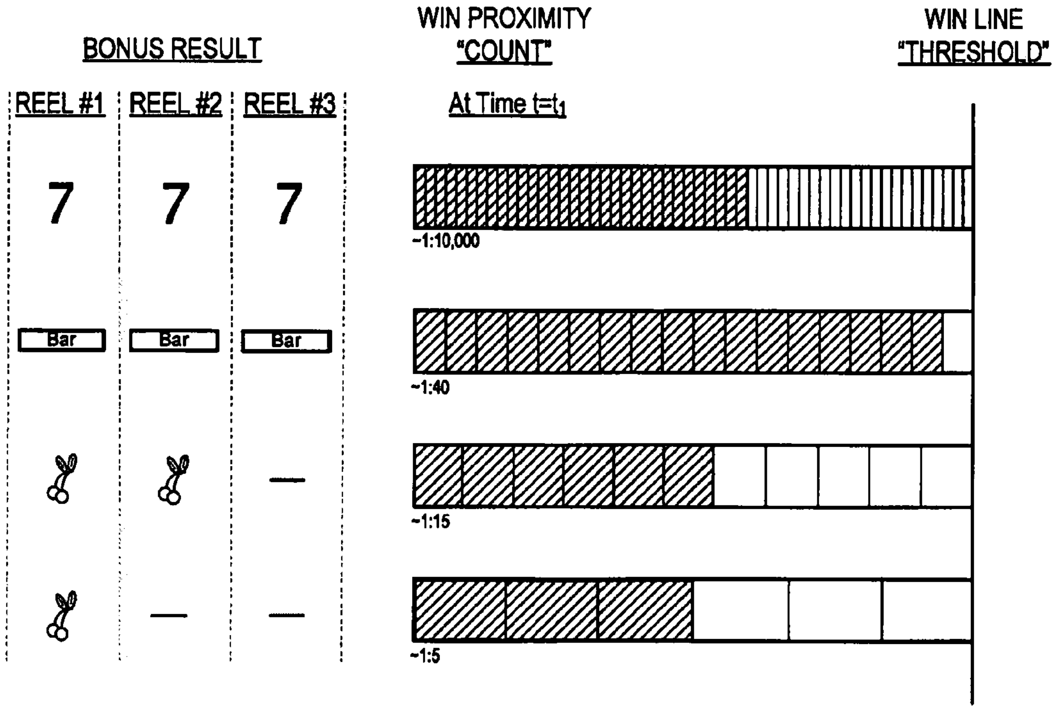
FIG. 10 illustrates a magnified view of the relationship of the count to the proximity of various bonus awards at time $t_1$.

FIG. 9A illustrates the bonus results showing symbols at designated indicia locations for the base game, wherein the base game is a three-reel slot machine. The win proximity column illustrates the percentage of advancement to the next threshold amount shown by the win line 'threshold'. For example, at time $t_1$, the count has advanced halfway to the threshold determined for a single-cherry bonus result. As shown in FIG. 10, with a count trigger of '6', the count has already been advanced by three for the single-cherry result. The count has advanced almost completely to the threshold determined for the BAR-BAR-BAR bonus result. As shown in FIG. 10, with a count trigger of '18', the count has already been advanced by seventeen. The trigger event for the bonus would then occur on the next count (e.g. the next play with a MAX credit bet).

Figure 9B:
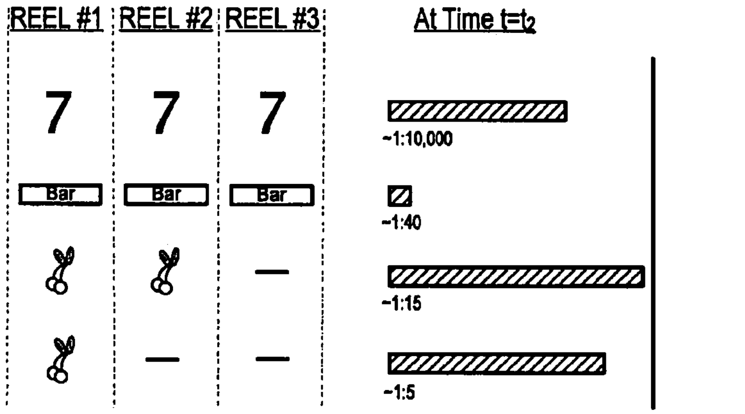

FIG. 9B illustrates the same four bonus results with win proximity at time $t_2$. One notes that the win proximity for the BAR-BAR-BAR bonus result is reset to zero after an award just after time $t_1$ and has now only advanced just a small amount toward the threshold set for the award. Whereas the count threshold may have been set at '18' by the RNG in a previous process step, once won the threshold is reset to a new number between the designated range of values. Here, as shown in FIG. 10, the next BAR-BAR-BAR result does not occur for a long period of time/count, such that the new threshold value is near its maximum of '80'. In this case, the count must advance eighty places before the BAR-BAR-BAR bonus result is again awarded. At time t2, the double-cherry bonus trigger is imminent. Note how, because of the high threshold amount for the 7-7-7 award, the win threshold for that award advances so slowly between $t_1$ and $t_2$.

Figure 9C:
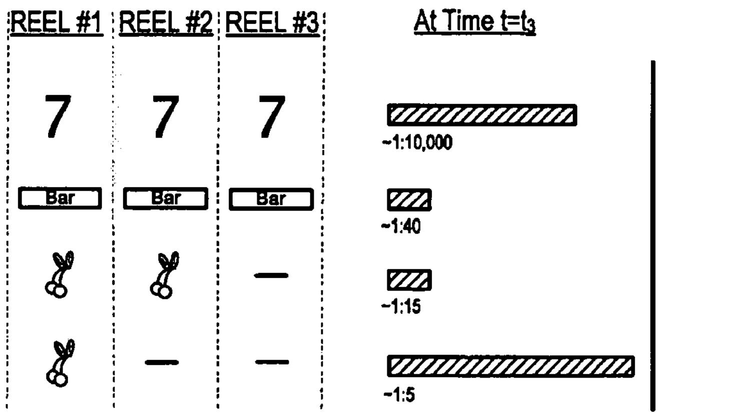

FIG. 9C illustrates the same four bonus results with win proximity at time $t_3$. This time takes place just after an award of the double-cherry bonus award and just before a single-cherry bonus award.

Figure 9D:
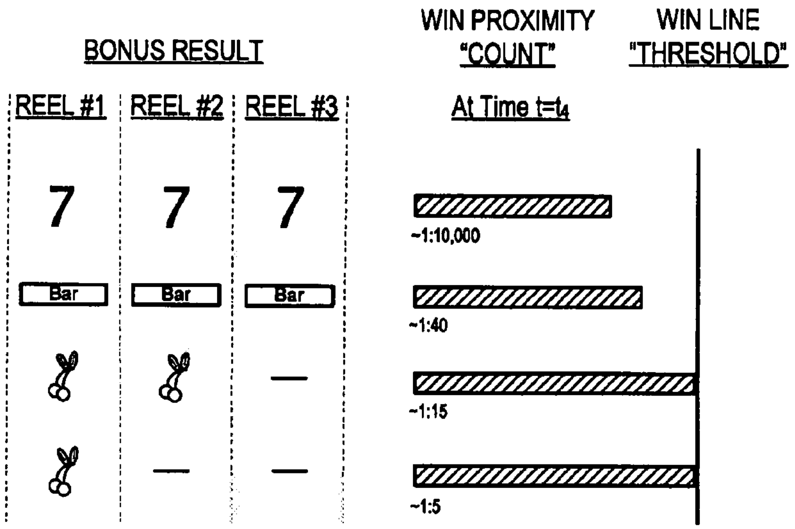

FIG. 9D illustrates the same four bonus results with win proximity at time $t_4$. By coincidence, the randomized threshold set for both the single-cherry and double-cherry bonus coincide with the count determined at time $t_4$. In this case, the awards may be presented consecutively, only one of the awards given, a combination, or a new award presented according to the preferences of the game operator.

Figure 9E:
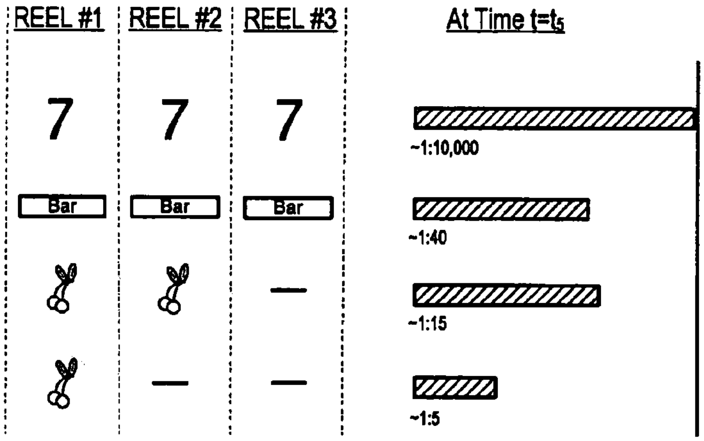

FIG. 9E illustrates the same four bonus results with win proximity at time $t_5$. This time takes place just before the large 7-7-7 bonus is to be awarded according to the teachings of the invention. That is, the count has advanced through much play until it finally approaches the threshold set for the 7-7-7 bonus.

FIG. 10 illustrates an expanded schematic tracking the win threshold for the four designated bonus results. The win proximity line for each result is shown with shaded and unshaded sections to illustrate how advancement takes place toward the win line 'threshold'. For the single-cherry result, at time $t_1$, the threshold number had been set at '6' and the player has already advanced three places toward the threshold win line. For the double-cherry result, at time $t_1$, the threshold number had been set at '11' and the player has already advanced six places. For the BAR-BAR-BAR result, the threshold number had been set at '18' and the player has already advanced seventeen places. The counts for the 7-7-7 result cannot be accurately presented in the drawing because there are so many. But the count is shown advanced almost 70% toward the win threshold, which is actually achieved at time $t_5$.

Operation of the invention will now be described. The gaming device comprises a base game having a base game display. A random number generator is operable with the base game to obtain a base game result, and the base game display operative to display the base game result. By operable, the RNG can physically exist within the gaming machine itself, be external to the gaming machine (e.g. within the bonus server), or be a combination of internal and external processes. A base game pay table is tied to the base game result and includes winning outcomes and non-winning outcomes. A bonus game award mechanism is configured to determine a threshold tied to a bonus result, track play of the base game, advance a counter responsive to play at the base game, display the bonus result at the base game display in place of the base game result when the counter bears a predefined relationship with the threshold, and award a bonus to a player. The step of displaying the bonus result at the base game display in place of the base game result can take place by the various methods described in FIG. 7 whereby the base game result is simply replaced or delayed. As the bonus result is intended to appear as an indistinguishable part of the base game, preferred implementations of the bonus game are by displaying winning indicia at the same base game indicia locations (e.g. in the slot locations, at the card locations, etc.) as base game indicia are displayed. By displaying the bonus at these base game indicia locations, the face that the winning result is a mystery bonus is masked from the player who instead thinks the result may have been randomly determined. As a result, the player may be encouraged to keep playing under the belief that they are lucky.

The bonus game award mechanism of the gaming device can be further configured to utilize at least one bonus result that does not match any base game result possible on the base game. For instance, in a three-reel slot game where the third coin-in funds the bonus, a 7-7-7 result is only possible in the bonus game and does not appear within the base game results table. In a video poker game, it might be configured so that a royal flush is only obtainable in a bonus game.

If the bonus game uses a special symbol, then that special symbol might only be obtained in a bonus event and never in a base game result. That is, the display of the base game may include indicia locations where the bonus game award mechanism is configured to display an indicia at one of the indicia locations that is unavailable in any base game outcome. So rather than all of the symbols being determined in the bonus game, the bonus result can be limited to the display of a single symbol at a designated indicia location. For example, when the indicia locations include three reel positions, a final one of the reel positions for the bonus result may be a -7-, wherein the final -7- indicia is unavailable in the primary game outcome to complete a 7-7-7 result.

The gaming device may further include a delay circuit for delaying display of the bonus result responsive to a specified event. In one aspect, the base game paytable may include winning outcomes and non-winning outcomes, wherein the specified event is one of the winning outcomes, and whereby the bonus outcome is displayed only after play of the base game results in a next non-winning outcome.

For player tracking, the gaming device may further include a player tracker with player record, wherein the threshold is set according to criteria stored in the player record. That is, the bonus threshold ranges may be adjusted to accommodate a particular player's psychographic profile such that easily discouraged players are incentivized to keep playing, even if the bonus awards adjusted are small. The threshold may be set differently for players having different player records. That is, and in contrast with the first player, a second player desirous of larger awards is incentivized by increasing the frequency at which large awards are granted in the bonus game, with a corresponding offset to the frequency of the smaller awards so that a particular payback percentage is maintained.

The invention also comprises a method of operating a gaming device having a base game that completely operates according to the mystery bonus system. The method comprises monitoring the occurrence of at least one base game event (e.g. "credit in") each time the base game is enabled. The base game would have a plurality of possible winning base game results and at least one non-winning base game results. The count is incremented for each occurrence of the monitored event, wherein the count is associated with a first one of the possible winning base game results. The count is then compared with a trigger threshold for a possible award and the winning result on the base game is displayed when the count bears a predefined relationship to the trigger threshold; otherwise, the base game displays one of the non-winning base game results. Whereas the game could simply display a single losing result message (e.g. "You Lose") if no winning results are to be displayed responsive to a threshold crossing event, it would be more common to display one of a plurality of indicia combinations (e.g. plum-lemon-BAR) that do not appear in a paytable for the gaming machine or otherwise result in a win.

A gaming device operating according to the above method comprises a results display having indicia locations for displaying indicia related to a game result and a game award mechanism. The game award mechanism is configured to determine a threshold tied to a winning game result, track play of the gaming device, advance a counter responsive to play at the gaming device, display the winning game result at the results display in the indicia locations when the counter bears a predefined relationship with the threshold, and award an amount to a player associated with the winning game result.

The gaming device of claim may further be configured to determine a threshold tied to a non-winning result, track play of the gaming device, advance a counter associated with the non-winning result responsive to play at the gaming device, and display the non-winning result at the results display in the indicia locations when the counter associated with the non-winning result bears a predefined relationship with the threshold tied to the non-winning result. As one example of this non-winning result, the bonus game award mechanism may be further configured to display a plurality of indicia at indicia locations of the results display that differ from a winning game result by only a single indicia.

Operation of the inventive device or method above may occur by incrementing a second count for each occurrence of the monitored event, wherein the second count is associated with a second one of the winning results on the base game and wherein the second winning result is different from the first winning result. The second count is then compared with a second trigger threshold. The second winning result is then displayed on the base game when the count bears a predefined relationship to the second trigger threshold. The second trigger threshold may be different from the first trigger threshold.

The count and threshold numbers can be configured to follow a player from game to game. The player is allowed to play on a first game machine and accumulate a count toward one or more mystery bonuses (e.g. first and second counts). The first and second (and other) counts are stored in a database coupled over a network to the first game machine. The player can stop play at the first game machine and begin play at a second game machine, the second game machine also coupled to the database via the network. As with play on the first machine, the first and second count are incremented responsive to play on the second game machine by the player.

Aspects of the invention also allow methods for supplementing a base game with a mystery bonus. A player is allowed to play the base game of a gaming machine and a base game result is randomly determined from a plurality of possible results. The plurality of possible results includes winning base game results and non-winning base game results. A bonus result and trigger threshold are determined as by consulting a list of possible bonus events, determining the odds for occurrence of the bonus events, setting a range of occurrences, and using a RNG to determine a trigger threshold from within the range. The tracked count is advanced response to play on the gaming machine, and the bonus result is displayed on the gaming device in place of the base game result when the count bears a predefined relationship (e.g. equal to) to the trigger threshold.

In one aspect of the invention, the step of displaying the bonus result occurs immediately after the count bears a predefined relationship to the trigger threshold. In another aspect of the invention, the step of displaying the bonus result on the gaming device in place of the base game result occurs only if the base game result is a non-winning base game result, otherwise delaying the step of displaying the bonus result until a non-winning base game result is randomly determined during play of the base game. In yet another aspect of the invention, the step of displaying the bonus result on the gaming device in place of the base game result occurs only if the base game result is a winning base game result below a certain threshold or is a non-winning base game result, otherwise delaying the step of displaying the bonus result until a non-winning base game result or a winning base game result below a certain threshold is randomly determined during play of the base game.

The method may further include resetting the count after the count bears a predefined relationship to the trigger threshold and determining a new trigger threshold for the bonus result. Play is allowed to continue on the base game of the gaming machine and the count advanced toward the new trigger threshold responsive to continued play on the gaming machine. The bonus result is then displayed on the gaming device in place of the base game result when the count bears a predefined relationship to the new trigger threshold.

The bonus result on the gaming machine may include a collection of indicia that is not to possible in any winning base game result. That is, a 7-7-7 may only be possible with a bonus result, but never a base game result.

Alternately, the step of displaying the bonus result on the gaming device in place of the base game result when the count bears a predefined relationship to the trigger threshold includes displaying a single bonus indicia at a single base game indicia location. That is, it is the single bonus indicia itself that is never included at the single base game indicia location in any base game result. For example, in a three reel slot machine, it is possible in the base game to achieve a '7' result in the first two reels, but that it is only possible to achieve a '7' in the third reel (to complete a 7-7-7 result) during a bonus event and never during a base game event.

Finally, the inventive method also includes steps of storing player preferences such as a psychographic profile and determining the trigger threshold responsive to the player preferences. This profile can be projected based upon a player's age, zip code, gender, etc. That is, the frequency of bonuses, and the bonus levels, are adjusted depending upon whether the player is easily discouraged and therefore likes more frequent, but smaller bonuses, or if the player is encouraged to keep playing for that one big win.

Accounting for wins using the methods described may affect some aspect of the payback percentage (e.g. "PAR") of the machines. As the PAR of gaming machines may need to be established, accounted for, and maintained by law, it may be necessary to account for mystery bonus occurrences using base game indicia to be accommodated separately. Different scenarios are contemplated. For instance, no winning base game result should be superceded or replaced by a mystery bonus result if the calculated PAR of a machine is to be maintained. That is, branch A from FIG. 7 is to be selected where the bonus result is presented at the indicia locations of the base game only in substitution for the next non-winning base game result. In this way, the base game results can be accounted for completely separately from the bonus game results.

With truly random outcomes, a player's specific gaming experience cannot be guaranteed. Thus, it is possible for first time player to play 100 times and never win. He'll never come back. But if one can provide a bonus during that gaming session, then he is more likely to come back. If one takes the typical 95% PAR pay-back percentage and reduce this to 60% from RNG and take the other 35% and pay back as bonuses then the bonuses can be used to ensure wins every so often. Plus, one might put in some marketing dollars, give rebates to best customers, and a little extra to the first time player. Studies show that first-time players are far more likely to come back to casino and remain a loyal customer after a winning experience than after a losing one. A best way to guaranty that first time players are winners is to use the described bonusing system.

As one example, one using the invention can market the following: "Guaranteed triple bar-triple bar-triple bar within the first 40 pulls". This result can be funded by marketing dollars—this as opposed to just handing first time players 100 credits when they walk through the door (thought of as a 'gift' rather than a 'win'). Therefore, such mystery bonus winnings can be accounted for under a marketing budget.

As for hardware, contemplated variations include: (1) build it in to single game box, e.g. within proximity indicator, (2) all kinds of games connected to a system, e.g. server, SMIB [single machine interface board], player tracking display, game has two sets of meters (software)+ability for some external device to stop at a given outcome; or (3) all machines have base game and game controller that performs RNG+SMIB where the server can issue bonus commands or you might have separate Bonus Server so that something outside of the machine issues command to SMIB, or directly to game board, to carry out command.

For specific accounting, a bonus award win can be partially funded from a bonus pool and/or marketing pool, and partly from the base game PAR. For example, if a bonus award results in payment of 100 credits but is presented in place of a base game award (e.g. via branch B in FIG. 7) that would have awarded 20 credits, then 20 of the 100 credits is accounted for in the base game PAR and the remaining 80 credits are accounted for in the bonus pool or marketing budget. If branch A is used, then the 5 credits played on the base game to advance the count and trigger the award would be taken into account in accounting so that the real bonus is 95 instead of 100 credits.

Gaming Device with Proximity Indicator

Figure 11:
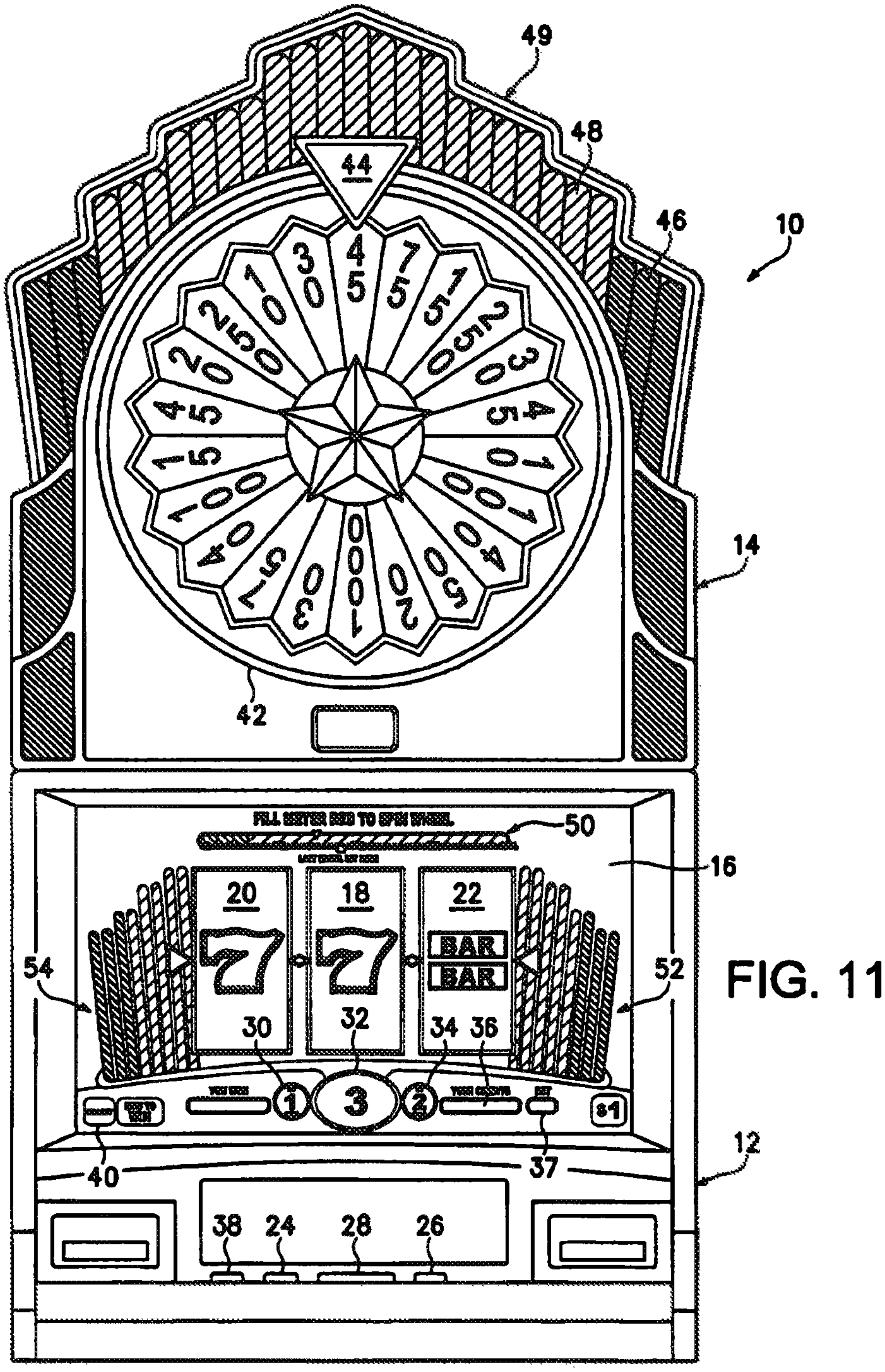
FIG. 11 is a front view of game adapted to implement the invention using a visually discernable proximity meter.

Turning now to FIG. 11, indicated generally at 10 is a gaming device constructed in accordance with the present invention to present a visual representation of win proximity. The gaming device includes a base game 12 and a secondary game 14. In the preferred embodiment of the invention, the secondary game is a mystery bonus game that displays bonus results in place of base results at the base game indicia locations so that there is no apparent difference between the base game and bonus game from the player's perspective. Gaming device 10 can incorporate, for example, a Bally CineVision gaming machine. In gaming device 10, the Bally game comprises the base game.

The Bally game includes a display 16 that comprises an LCD screen. Display 16 displays information about the outcome of the video slot game played by base game 12 in the form of three video reel symbols 18, 20, 22 defining the base game indicia locations. It also displays, on either side and above the reel symbols, information related to the secondary game, which will shortly be described more fully.

In the present embodiment, the base game accepts wagers of one, two, or three credits. These are placed by pressing a corresponding one of buttons 24, 26, 28, respectively. Alternatively, or in addition, touch screen symbols 30, 32, 34, respectively, may be used to place a bet. Display 16 further includes a Your Credits display 36 for showing total credits on the machine, including credits applied by a player as well as credits won as a result of play. A Bet display 37 shows the amount bet on the current game. A cash-out button 38 permits a player to receive all of his or her credits on the machine at the conclusion of play. A corresponding Collect image 40 can be provided to facilitate the same function, either alternatively or in addition to button 38.

Although a distinct secondary game is not preferred in the practice of the present invention, one is described below in combination with the element of win proximity. Secondary game 14 includes a rotatable mechanical wheel 42, although it should be appreciated that other types of indicators, including lighted simulations of wheels and other indications, could be equally well used. When the secondary game is enabled and played, wheel 42 rotates about an axis in the center of the wheel. A pointer 44 points to one of the awards in the segments of wheel 42 when it comes to a stop, thus indicating the amount awarded in the secondary game. As with the other embodiments, the opportunity to play the secondary game is a mystery award that is not tied to the outcome of the base game.

Gaming device 10 indicates in several ways how close the player is to being eligible to play the secondary game, i.e., how close the mystery bonus is. First, illuminated polymer rods, like rods 46, 48, span the top of the gaming device above the wheel and form a semicircular lighting bank 49. In this view, rod 46 is colored red as are all other rods that are similarly designated with upper-left to lower-right cross hatching. Rod 48 is colored blue as are all other rods that are similarly designated with lower-left to upper-right cross hatching. As will be described in more detail, as the likelihood of playing the secondary game, i.e., the mystery bonus, becomes higher, the color of the rods progressively changes so that more become red as fewer remain blue.

The second way in which the player is informed about the proximity to the mystery bonus is a meter 50, which comprises an image on display 16 above the image of reel symbols 18, 20, 22. As will also be described in more detail, a left portion of the meter is red and a right is blue with the left portion progressively moving to the right thus making the meter more red and less blue as the mystery approaches.

The third way that the player is informed about progress toward the mystery bonus is by images of rods 52, 54, which flank either side of the reel images and which mirror the progression in color of the polymer rods on the top of gaming device 10. Rod images 52, 54 are also hatched in the same fashion as rods 46, 48 to indicate color.

Figure 12:
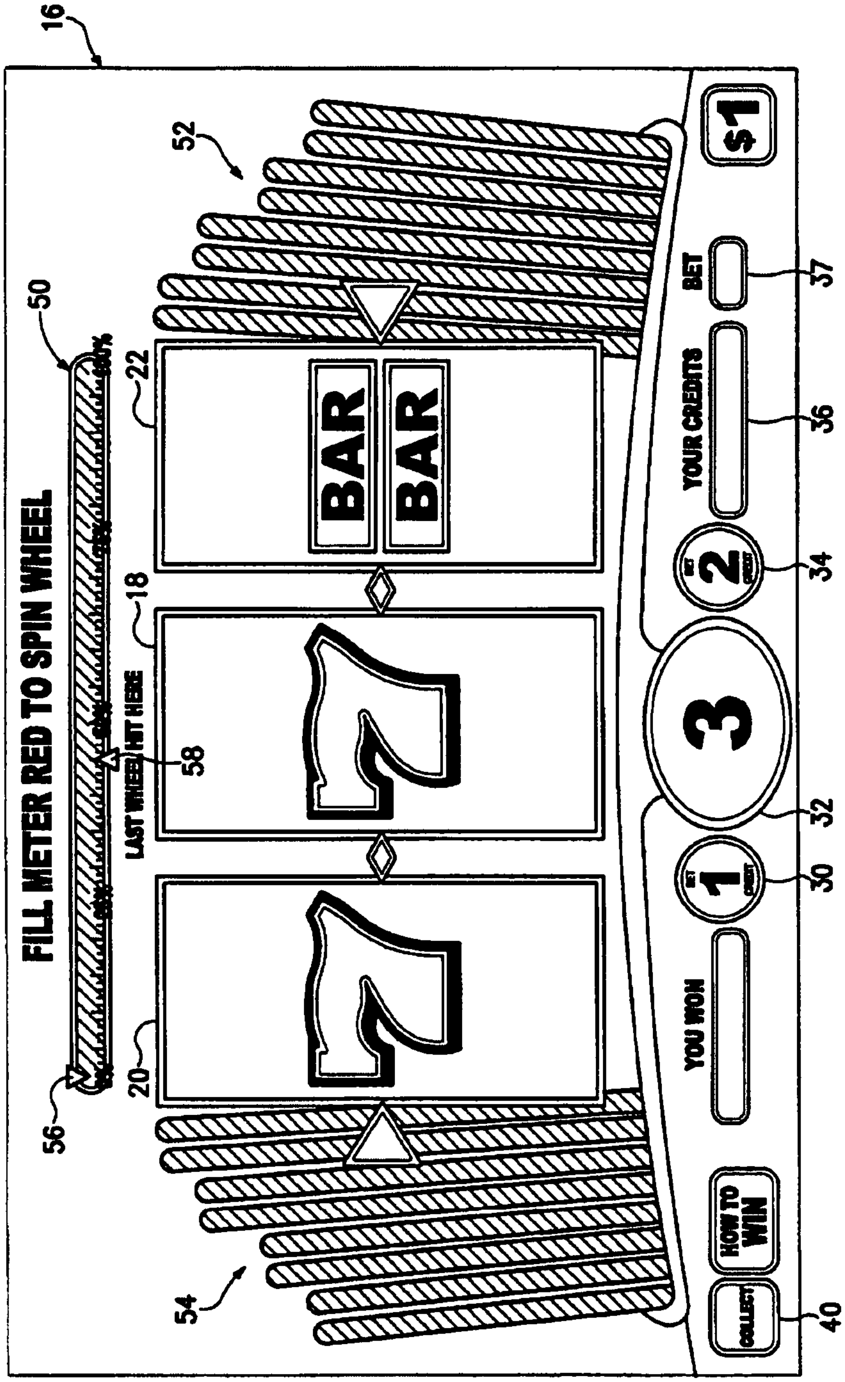
FIG. 12 is an enlarged view of a screen in the view of FIG. 11.

Consideration will now be given to play of the game from a player's perspective before description of the hardware and software to implement the game. Turning now to FIG. 12, display 16 is shown after a play of the bonus game. As a result, the meter 50 is illustrated as being all blue, indicating that the player may be far from obtaining a mystery bonus (e.g. "cool/blue" as opposed to "hot/red"). It should be appreciated, however, that a mystery round is typically started at a low end of a range defined by low and high numbers so that even after the secondary game has just been played, the red portion of the meter will indicate a starting point at zero, although the initial starting point could be above zero as well.

Meter 50 further includes pointer images 56, 58. Pointer 56 is aligned with the dividing line between the red and blue portions of the meter, thus indicating progress toward another secondary game. Pointer 58 points to the location on the meter when the last mystery was triggered. Additional pointers (not shown), similar to pointer 58, could be added to indicate the location on the meter when the mystery was triggered for the last two, three, or more secondary games.

Figure 13:
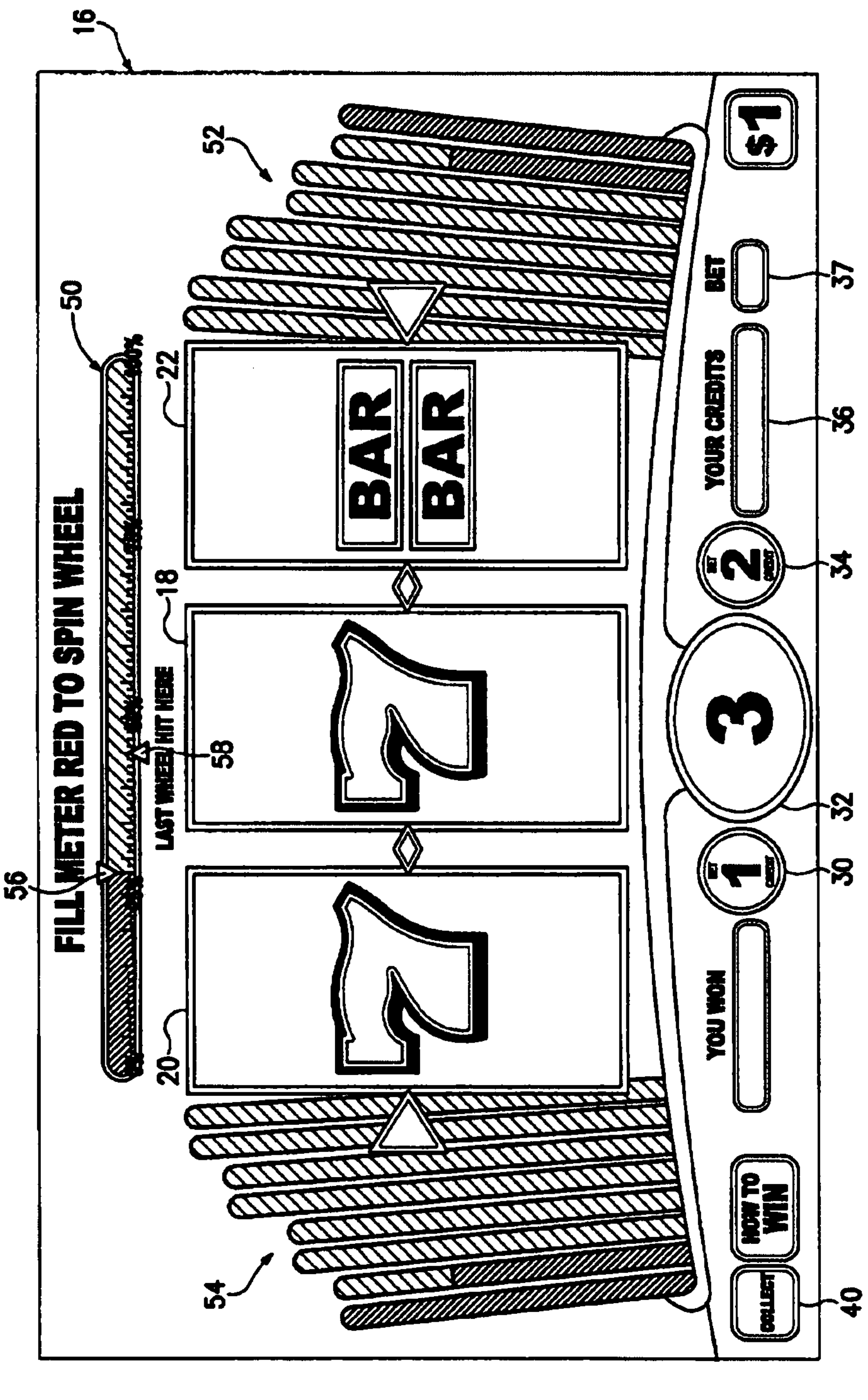
FIGS. 13-16 are views of the screen of FIG. 12 in different stages of game play.

Continuing to FIG. 13, multiple plays on base game 11 have occurred so that pointer 56, as well as the red and blue images, indicate further progression toward the mystery bonus, i.e., play of the secondary game. As will be explained more fully in connection with a description of how the game is implemented, the progression of pointer 56 as play continues may provide an indication of how close the machine is to providing the mystery award or it may indicate how close the machine is to the upper end of a range that contains a randomly selected trigger of the mystery award, preferably the latter.

Figure 14:
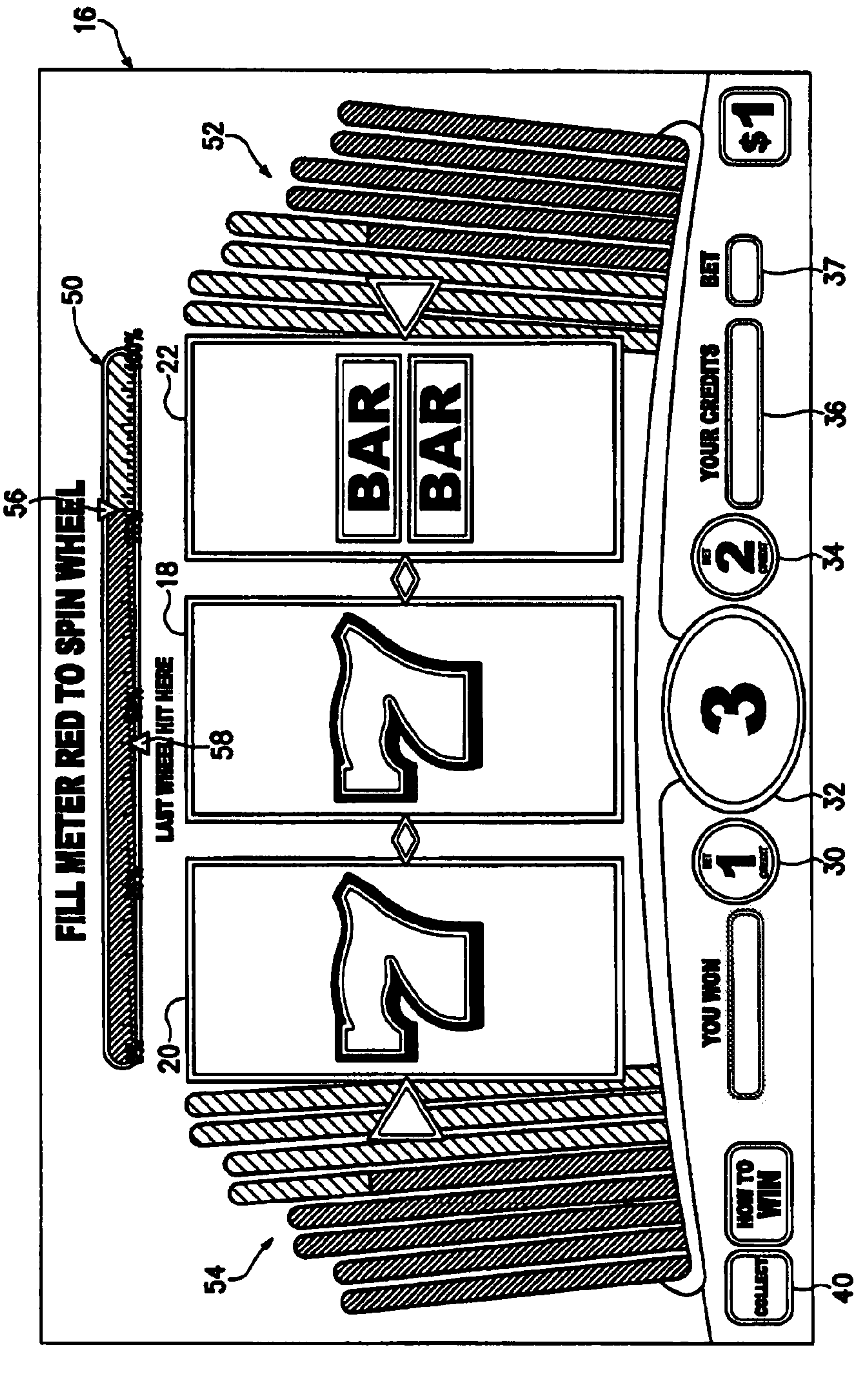
Figure 15:
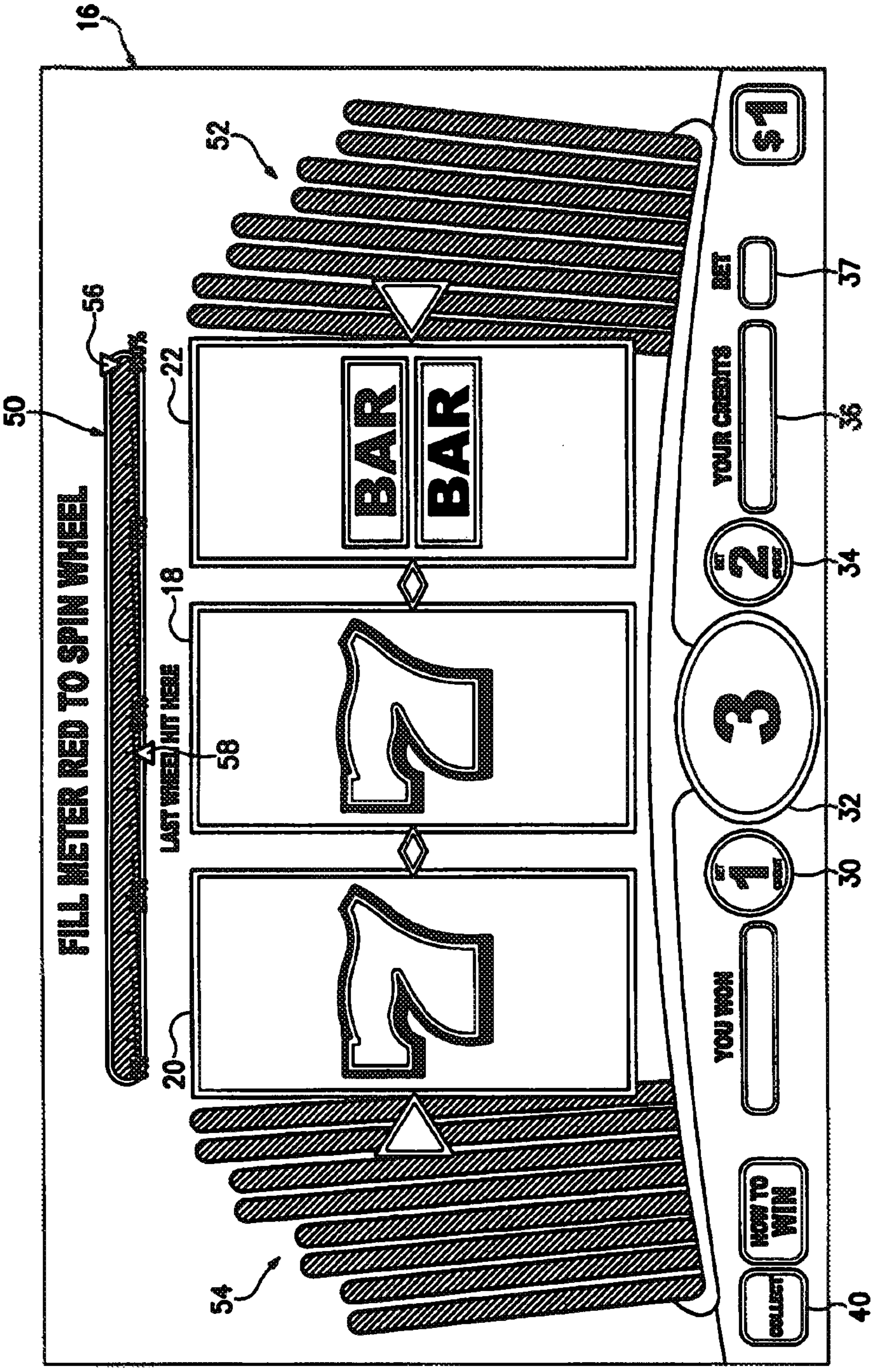

In FIG. 14, the pointer 56 has further progressed, and in this illustration, the machine has triggered play of the secondary game at the location of pointer 56 in FIG. 14. When this happens, pointer 56 and the corresponding dividing line between the red and blue images move rapidly all the way to the right, thus filling the meter with all red, as shown in FIG. 15. The player is then instructed, via display 16, to hit button 28 to play the secondary game. This initiates rotation of wheel 42, which spins and stops on a number indicating the amount of credit that then goes to the Your Credits display 36. The game is reset, as will be described, and progress begins toward the opportunity to play another secondary game.

In still another approach to displaying win proximity, the rightmost position of the meter is not tied to either the top value in the range from which the random trigger is selected or to the value of the random trigger. Rather, the rightmost meter value starts at the top value in the range from which the trigger is selected and changes toward the value of the random trigger as the count progresses. This results in meter movement proportional to more than one count at a time as the rightmost value of the meter decreases toward the random trigger value. Of course, the counter continues to count one count at time, and all of the counts between the lower end of the range and the random trigger must occur before the secondary game is triggered.

Figure 16:
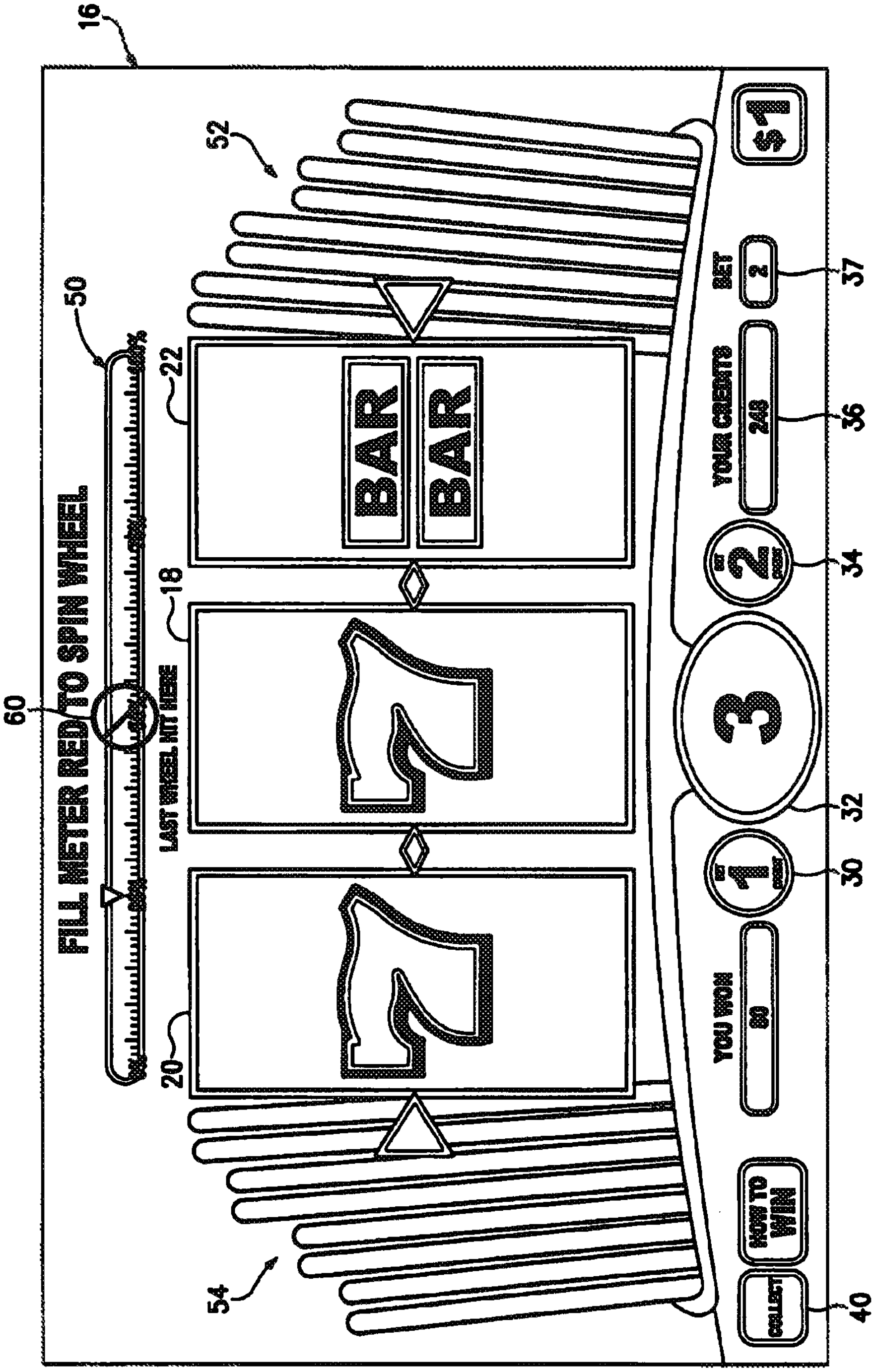

In a preferred embodiment, only a maximum credit bet (3 credits in the game depicted here), qualifies the player to play the secondary game. A bet of one or two credits will result in the player not being eligible to play the secondary game according to rules set forth in the eligibility engine operating at controller or within the machine 10. When deactivation of the win proximity occurs due to non-qualification, all of the displays that indicate progress toward play of the secondary game may be shown in gray, as can be seen in FIG. 16. And the rods, like rods 46, 48 (FIG. 11), also become a gray or neutral light. A symbol (a circle with a slash) 60 also appears over meter 50 to indicate that there is no eligibility nor will the progress toward the game be displayed. Alternatively, one or more of these win proximity indicators may be shown even when the wager is less than the maximum possible wager. In still another implementation, only wagers that are less than a predetermined value are counted, e.g., only wagers of one credit or of one or two credits.

The term "graphical" as used herein means a pictorial representation. This could include changes in images on a display, changes in light intensity, changes in color, or a combination of the foregoing, whether or not combined with numeric, alphabetical or alphanumeric displays.

In an alternative embodiment, audio indications could be used in lieu of or in addition to graphical indications of win proximity. Substantially the same controls used that are used to create graphical indications of win proximity could be used to create audio indications. In other words, signals generated by the controls are applied to an audio system that provides an audio indication of the change in likelihood of awarding a bonus award.

Sometimes casinos are plagued by undesirable players, some of whom operate in teams, looking to play games only when a mystery award appears to be near. Because prior art systems, as described above, show the current value of an award and because the high end of the award is known, players may begin playing minimum credits only until the award is near. This reduces revenue from the games and potentially awards these undesirable players at the expense of patrons who generate more revenue for the casino. These undesirable players are discouraged by requiring maximum credits to be eligible for the mystery award and by preventing display of the mystery proximity when less than maximum credits are played. Other rules may be implemented within the eligibility engine to activate or deactivate one or more win proximity meters, e.g. time between wagers, credits remaining, player status (e.g. automatically for a newly incoming player for the first 15 minutes of their wagering, and thereafter only if they reach gold status), time and date (e.g. the proximity meter may be available only during special occasions), etc., and any combination of the above.

It will be appreciated that with multiple possible bonus game results as noted in FIGS. 9A-9E that win proximity advances at different rates depending upon the odds or achieving the bonus result. For instance, a single-cherry result would approach its designated trigger threshold much more quickly that a 7-7-7 bonus result. It will be further appreciated that the win-proximity advance lines in FIGS. 9A-9E give a visual representation of the approximate percentage advancement toward the trigger threshold. It is contemplated that the win threshold may be displayed using the colored rods 46, 48 using only the bonus award having the greatest advancement toward the win threshold trigger. Thus, the win proximity would be displayed for the BAR-BAR-BAR result at time $t_1$, for the double-cherry result at time $t_2$, for the single-result at time $t_3$, for either of the single- or double-cherry result at time $t_4$, and for the 7-7-7 result at time $t_5$. It will further be appreciated that because of the different rates of advancement of the win proximity for each of the results, that there may be a cross-over point at which the win proximity advances slowly (e.g. because the 7-7-7 win proximity is being tracked) but then is overtaken by a more quickly advancing (e.g. single-cherry) bonus result. In this case, the player would see a sudden quick rise in proximity and know that one is imminent event though it had been only slowly advancing before. This sudden advancement may add yet further enjoyment to the player's experience.

Figure 17:
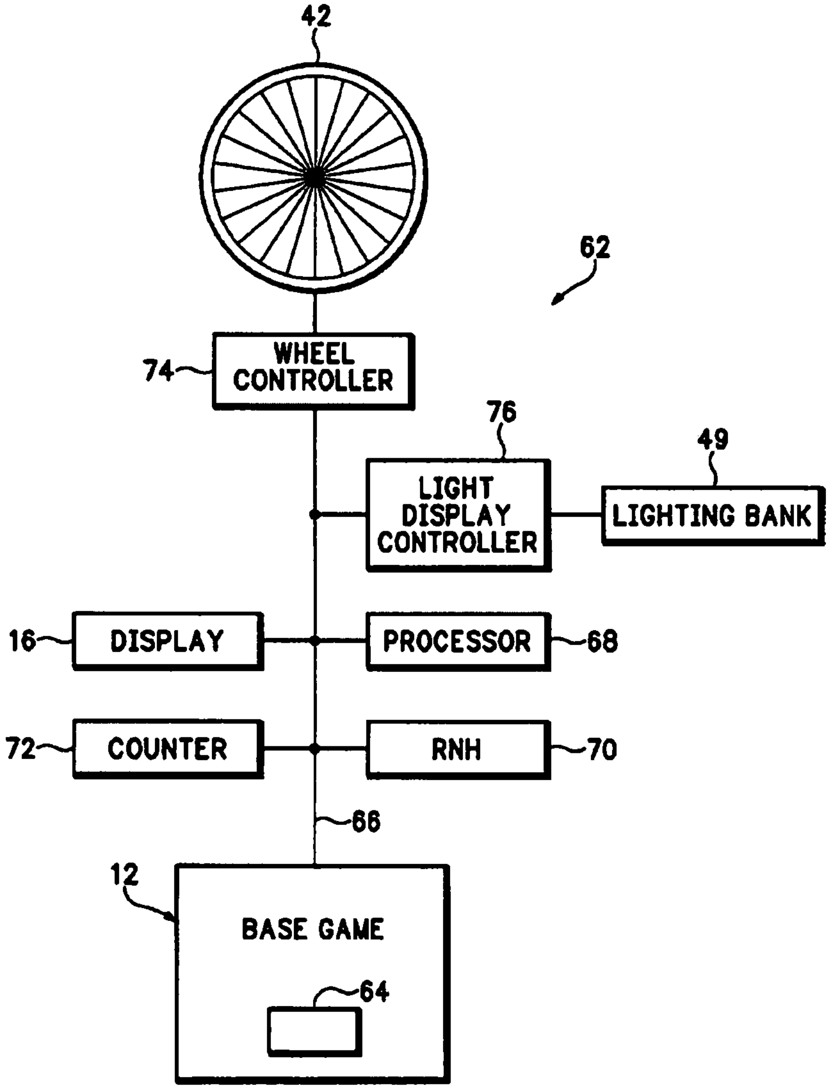
FIG. 17 is a highly schematic diagram of selected components of the game of FIG. 11.

With reference to FIG. 17, consideration will now be given to the implementation of gaming device 10. Indicated generally at 62 is a highly schematic diagram of some of the components of gaming device 10. Components that have been previously identified retain the same numeral in FIG. 17. Base game 12 includes a pay table 64 that controls the odds of producing various combinations of reel symbols 18, 20, 22 (in FIG. 11), some of which provide associated base-game awards. Control of video slot machines that implement such pay tables is well known. Although display 16 is built into the base game, inputs into the base game permit images related to the secondary game, as described above, to appear on the display along with the base-game reel symbols.

A bus 66 communicates with base game 12 and display 16. Also in communication with the bus are a processor 68, a random number generator (RNG) 70, a counter 72, a wheel controller 74, and a light display controller 76. Processor 68 is programmed, as will be soon described, to selectively activate wheel controller 74, which in turn causes wheel 42 to spin and stop at a preselected number.

In the present embodiment, processor 68 is part of the base game. In addition to controlling the base game, additional programming, as will be explained, is implemented to control the secondary game. For example, processor 68 is programmed to trigger RNG 70, which in the present embodiment is implemented in software, upon completion of a secondary game to select a new trigger threshold for the next secondary game. Counter 72, also implemented in software in this embodiment, counts each base game played with maximum (in this case 3) credits, and when the trigger threshold is reached, processor 68 triggers the start of the next secondary game. Additional counters could be implemented to count toward their associated trigger thresholds to provide additional awards via additional bonus award mechanisms. This could be an implementation in which each of the segments in wheel 42 has its own associated counter, trigger threshold and award as described above in connection with a different embodiment. The bonus award mechanism in the present embodiment of the invention comprises the software and associated hardware that delivers the bonus to a player.

The processor also indicates which light displays, both on display 16 and on lighting bank 49, are presented depending upon the state of game play.

In another approach, the odds of playing the secondary game may be improved by changing the odds for a random number generator (RNG) to trigger the secondary game after each play of the base game. For example, an RNG could be programmed to have a 1/200 chance to trigger the secondary game after the first play of the base game and thereafter reduce the odds after each successive game in the following sequence: 1/199, 1/198, 1/197 . . . 1/1 until the secondary game is triggered. In a variation on this aspect, the odds might only reduce after each game to a certain level and then hold at that level for additional base games.

In another variation, the odds of winning decrease with each successive play. For example, on the first play odds of 1/10 are provided for winning the secondary bonus. On the second play, odds of 1/11, etc. Odds of winning the secondary bonus could continually increase or decrease, increase or decrease until a limit was reached or increase for a period of time and then decrease and then increase again. In addition, odds could change after one or more wagers and not change after another one or more wagers. Any such sequence of successively changing odds is useful with the invention. One of ordinary skill in the art could readily implement this variation.

Figure 18:
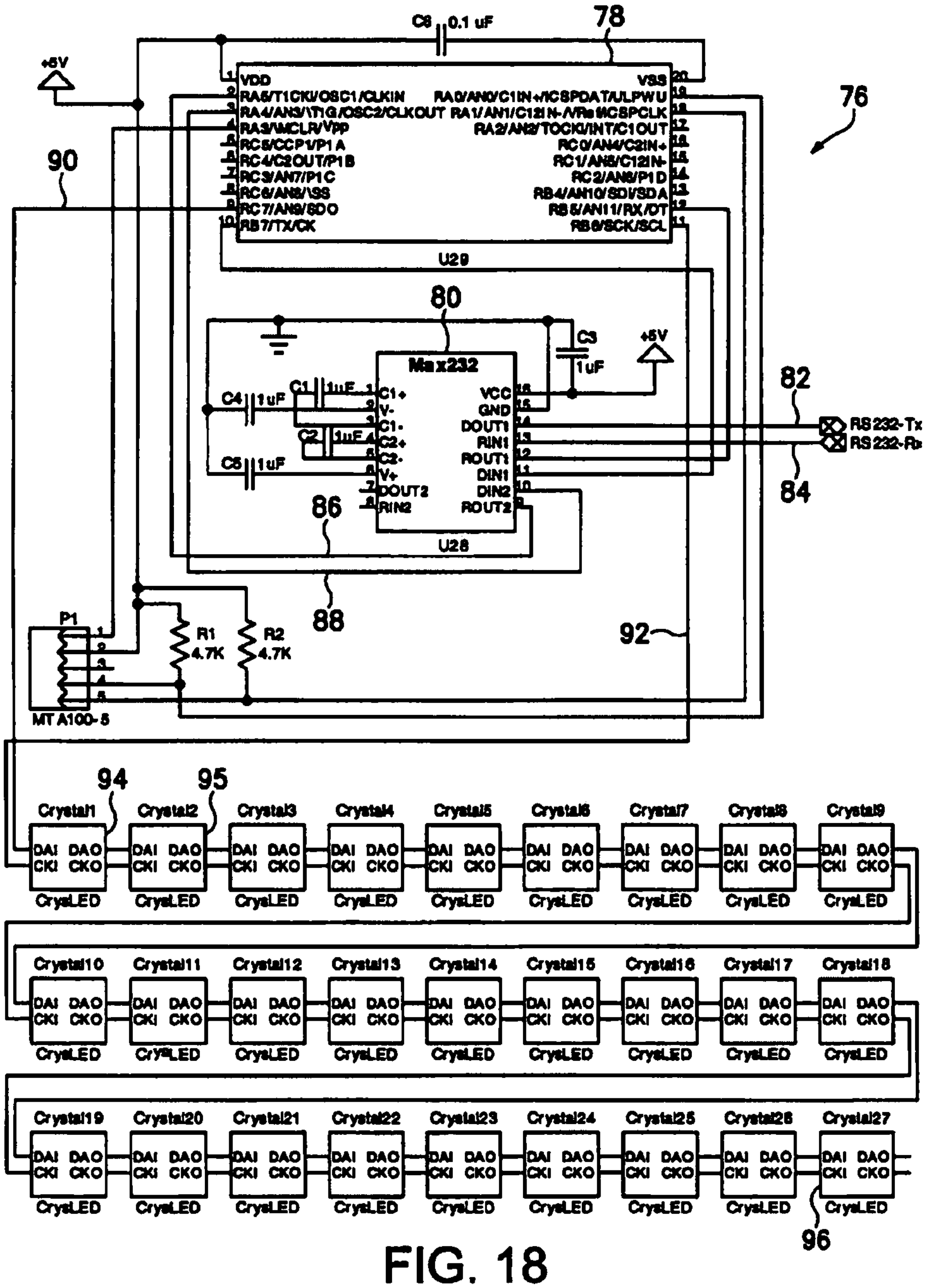
FIGS. 18-19 are schematic diagrams of a portion of the circuitry for controlling lights and displays on the game of FIG. 11.

FIG. 18 comprises a schematic diagram of light display controller 76 in FIG. 17. Light display controller 76 includes a Programmable Intelligent Computer (PIC) microprocessor 78 and an RS232 interface 80. Interface 80 communicates with processor 68 via a transmit line 82 and a receive line 84. Interface 80 in turn communicates with PIC microprocessor 78 via lines 86, 88.

The PIC microprocessor includes a serial data out (SDO) line 90 and a clock (CLK) line 92 that are connected to a light module 94, which is the first in a chain of light modules, including the next light module 59 and the last light module 96. There are a total of 27 light modules, one for each of the rods, like rods 42, 42, in light bank 49. As will soon be seen, each light module controls the light in a particular one of the rods to create a variety of lighting effects.

Figure 19:
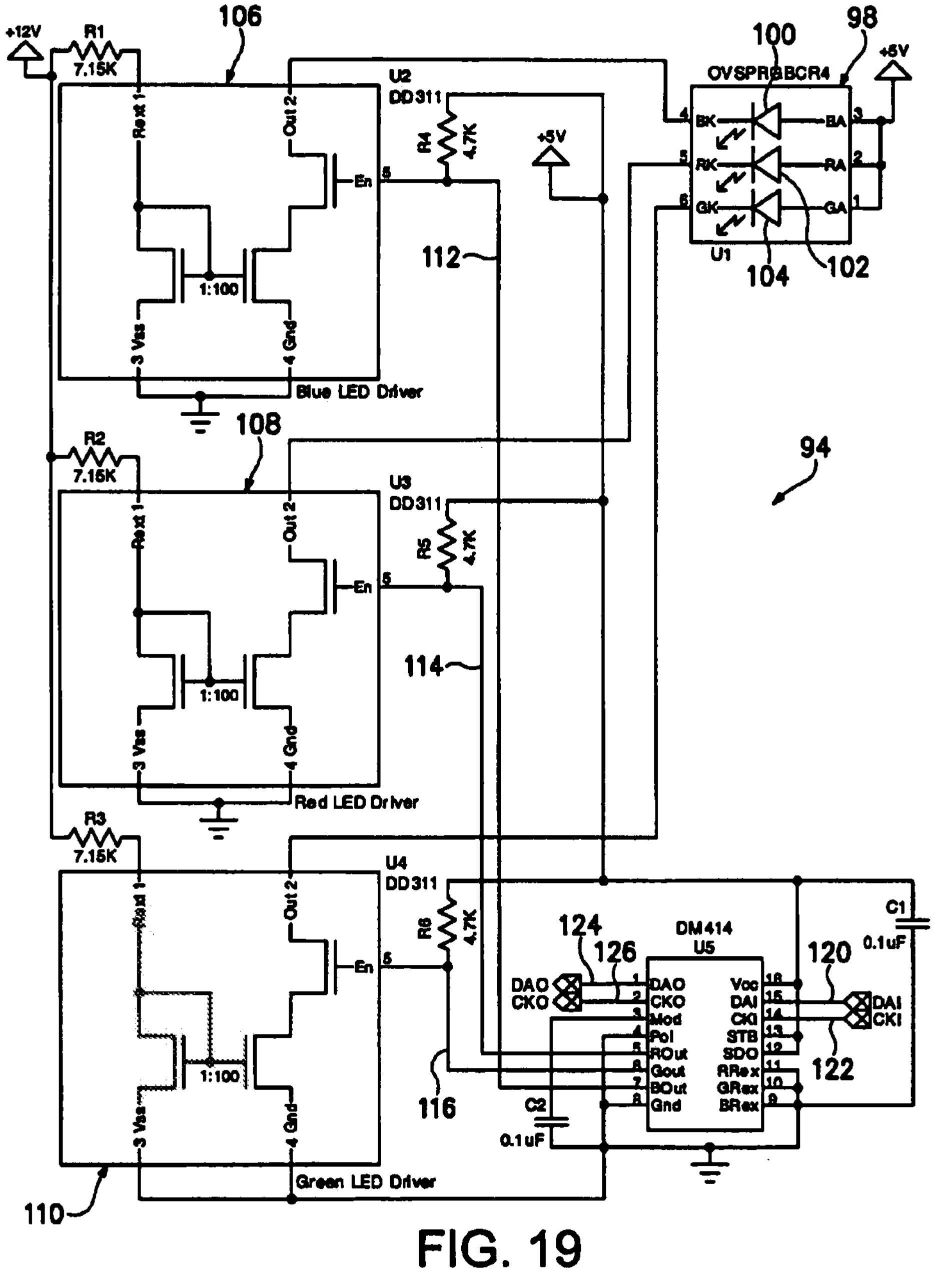

For a more detailed schematic of each of the light modules, attention is directed to FIG. 19, which depicts light module 94. Light module 94 is substantially identical to each of the other light modules. Included therein is a tri-color LED chip 98. Chip 98 includes a blue LED 100, a red LED 102, and a green LED 104. Each LED has its anode tied to +5 volts, and each cathode is driven with a separate dedicated LED driver 106, 108, 110, respectively. Each driver includes an enable line 112, 114, 116, respectively. The enable lines are driven by a chip 118 in response to data provided to the chip via data-in (DAI) terminal 120 and clock (CLK) terminal 122. The data in chip 118 may be shifted out to the next light module 95 in FIG. 18 via data-out (DAO) terminal 122 and clock (CLK) terminal 126.

The data that is transferred into each light module, like light module 94, via DAI and CLK terminals, like DAI terminal 120 and CLK terminal 122 comprises 24 bits of data, 8 bits associated with each color. Each 8 bits modulates a pulse with signal on their associated enable line, like the blue enable line 112. As a result, each color can be selected with an intensity of between 0 and 255, with 0 being off and 255 being the most intense illumination possible.

Each of tri-color LED chips is positioned at the base of a corresponding one of the rods, like rods 46, 48, in light bank 49. In the present embodiment, the rods are made from Plexiglas polymer, which conducts light into a light channel surrounded with a frosted edge. The result is a rod that glows with selected colors and intensities.

In operation, a number of pre-programmed lighting modes are stored in a memory associated with PIC microprocessor 78. These include:

PURE_SWEEP—sets all 27 rods to the same color.

GRAY—fills all rods with gray that starts at the center rod and sweeps toward the outer rods on each side in a little over a second.

REDFILL—fills all rods with blue starting at the outer rods and sweeping toward the center in a little over a second.

RANBOW_ANIM—starts with the rods set to different colors and rotates the colors from left to right.

BLUETORED—processor 68 provides a single byte with a value of 0-255 to PIC microprocessor 78, which determines the percentage of rods starting from the outside and moving toward the center) that are red. The rest of the rods are blue except for the one between the transition from red to blue, which is a combination of blue and red.

The value of the byte provided in the BLUETORED mode is related to the likelihood of initiating the secondary game. As described above this could be an indication of the how close the count is to the random trigger value, to the upper end of the range from which the random trigger value is chosen, or to a combination of the two. In addition to driving the rods, signals from light display controller 76 also control the display of meter 50 and the display of rod images 52. As a result, coordinated graphical representations of win proximity are provided in a variety of ways.

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out in the appended claims.

The invention claimed is:

1. A gaming device comprising:

a base game having a base game display;

a bill acceptor associated with the gaming device for receiving and validating one of a bill and a ticket received at the acceptor;

a credit meter on the gaming device, the credit meter being operable to display credits available for play when the one of a bill and ticket is received;

a random number generator operable with the base game to obtain a base game result for each play of the base game, each result comprising a combination of symbols that may be a winning result or a losing result, the base game display operative to display the base game result on a result display;

a counter configured to count the number of base game results to a predefined threshold;

a bonus result comprising a winning combination of symbols generated independently from the base game results determined by the random number generator;

a delay circuit for delaying display of the bonus result until the next non-winning result produced by the base game if the base game result that advanced the counter to the predefined threshold is a winning result;

a bonus game award mechanism configured to display the bonus result on the result display in place of and substituting for the next non-winning result produced by the base game after the threshold is reached and award a bonus to a player;

a ticket printer associated with the gaming device; and a ticket issued by the ticket printer reflecting the balance of credits that remain on the gaming device.

2. The gaming device of claim 1, wherein the gaming device includes a plurality of bonus results including at least one bonus result that does not match any base game result possible on the base game.

3. The gaming device of claim 1, the result display including indicia locations and wherein the bonus game award mechanism is configured to display an indicia at one of the indicia locations that is unavailable in any base game outcome.

4. The gaming device of claim 3, wherein the indicia locations include three reel positions and a final one of the reel positions for the bonus result is a -7-, wherein the final -7- indicia is unavailable in the base game outcome.

5. The gaming device of claim 1, further including:

a player tracker with player record; and wherein the threshold is set according to criteria stored in the player record.

6. The gaming device of claim 5, wherein the threshold is set differently for players having different player records.

7. The gaming device of claim 1, wherein the gaming device includes a plurality of base games, the counter being further configured to track play of the plurality of base games and advance a count responsive to play at the plurality of base games, the result display displaying a bonus result at a particular one of the plurality of base games in place of and substituting for the base game result at that particular one of the plurality of base games.

8. The gaming device of claim 1, wherein the gaming device is configured to allow play by a plurality of players, the counter being further configured to track play by the plurality of players and advance a count responsive to play by the plurality of players, the result display displaying a bonus result to a particular one of the plurality of players in place of and substituting for a base game result obtained by that particular player.

9. The gaming device of claim 8, wherein the plurality of players form a group selected according to a common player profile.

10. The gaming device of claim 1, wherein the random number generator is integrated within the base game.

11. The gaming device of claim 1, wherein the random number generator is external of the base game.

12. The gaming device of claim 1, wherein the bonus game award mechanism is integrated within the base game.

13. The gaming device of claim 1, wherein the bonus game award mechanism is external of the base game.

14. The gaming device of claim 1 wherein the threshold comprises a number randomly selected from within a predefined range of numbers.

15. The gaming device of claim 14 wherein the counter is configured to determine a plurality of thresholds each tied to a different bonus result.

16. The gaming device of claim 15 wherein each threshold comprises a number randomly selected from within a predefined range of numbers.

17. The gaming device of claim 16 wherein at least two of the numbers are randomly selected from within different predefined ranges of numbers.

18. The gaming device of clam 17 wherein the predefined range of numbers for one bonus result is at least two orders of magnitude greater than the predefined range of numbers for another bonus result.

19. The gaming device of claim 1 wherein the gaming device further includes a plurality of spinnable reels each having a plurality of symbols thereon and wherein the combinations of symbols are made up of at least one symbol from each of at least two of the reels.

* * * * *